US012235348B2

United States Patent
Nguyen et al.

(10) Patent No.: US 12,235,348 B2
(45) Date of Patent: Feb. 25, 2025

(54) INTERACTIVE CONTROL WITH RANGING AND GESTURING BETWEEN DEVICES

(71) Applicant: Samsung Electronics Co., Ltd., Suwon-si (KR)

(72) Inventors: Hoang Viet Nguyen, Plano, TX (US); Jin Cao, Richardson, TX (US); Guanbo Chen, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 17/342,347

(22) Filed: Jun. 8, 2021

(65) Prior Publication Data

US 2022/0137204 A1  May 5, 2022

Related U.S. Application Data

(60) Provisional application No. 63/153,099, filed on Feb. 24, 2021, provisional application No. 63/108,737, filed on Nov. 2, 2020.

(51) Int. Cl.
*G01S 13/62* (2006.01)
*G01S 13/56* (2006.01)
(Continued)

(52) U.S. Cl.
CPC .............. *G01S 13/62* (2013.01); *G01S 13/56* (2013.01); *G01S 13/878* (2013.01); *G06F 3/017* (2013.01)

(58) Field of Classification Search
None
See application file for complete search history.

(56) References Cited

U.S. PATENT DOCUMENTS 8,527,908 B2  9/2013  Pance et al.
9,332,111 B2  5/2016  Kim et al.
(Continued)

FOREIGN PATENT DOCUMENTS

KR   10-2012-0056698 A   6/2012
KR   10-2014-0125018 A   10/2014
(Continued)

OTHER PUBLICATIONS

International Search Report and Written Opinion issued Feb. 11, 2022 regarding International Application No. PCT/KR2021/015330, 9 pages.
(Continued)

*Primary Examiner* — Whitney Moore

(57) ABSTRACT

A method for operating an electronic device includes transmitting signals to an external electronic device. The method also includes receiving signals from the external electronic device. The method further includes generating location information of the external electronic device relative to the electronic device based on a differences between the transmitted signals and the received signals. Additionally, the method includes determining an action for changing a state on at least one of the electronic device or the external electronic device based on the location information. In response to determining that the action is associated with the electronic device, the method includes performing the action. Additionally or alternatively, in response to determining that the action is associated with the external electronic device, the method includes sending an instruction to the external electronic device to perform the action.

28 Claims, 27 Drawing Sheets

(51) Int. Cl.
  *G01S 13/87* (2006.01)
  *G06F 3/01* (2006.01)

(56) References Cited

U.S. PATENT DOCUMENTS

| | | |
|---|---|---|
| 9,417,704 B1 | 8/2016 | Smus et al. |
| 9,575,560 B2 | 2/2017 | Poupyrev et al. |
| 9,921,657 B2 | 3/2018 | Sprenger et al. |
| 10,019,894 B2 | 7/2018 | Agardh et al. |
| 10,158,750 B2 | 12/2018 | Dagit, III |
| 10,462,633 B2 | 10/2019 | Haverinen et al. |
| 10,764,976 B2 | 9/2020 | Kim et al. |
| 11,275,164 B2 | 3/2022 | Yoon |
| 2013/0194180 A1 | 8/2013 | Ahn et al. |
| 2014/0028921 A1 | 1/2014 | Moon et al. |
| 2014/0355389 A1 | 12/2014 | Reunamaki et al. |
| 2015/0277569 A1* | 10/2015 | Sprenger ............... G06F 3/017 345/156 |
| 2016/0370450 A1 | 12/2016 | Thorn et al. |
| 2017/0139657 A1 | 5/2017 | Shah et al. |
| 2017/0160800 A1 | 6/2017 | Reunamaki et al. |
| 2019/0006891 A1* | 1/2019 | Park ....................... H02J 50/80 |
| 2019/0384409 A1 | 12/2019 | Omer et al. |
| 2020/0057505 A1 | 2/2020 | Carter et al. |
| 2020/0092925 A1* | 3/2020 | Foster .................. H04W 76/14 |
| 2020/0125050 A1 | 4/2020 | Short et al. |
| 2020/0404489 A1 | 12/2020 | Alameh et al. |
| 2021/0134079 A1* | 5/2021 | Nee ....................... G01S 7/4972 |

FOREIGN PATENT DOCUMENTS

| | | |
|---|---|---|
| KR | 10-1654464 B1 | 9/2016 |
| KR | 10-1928417 B1 | 12/2018 |
| KR | 10-2019-0054456 A | 5/2019 |
| KR | 10-2076489 B1 | 2/2020 |

OTHER PUBLICATIONS

Extended European Search Report issued Oct. 27, 2023 regarding Application No. 21886855.2, 15 pages.

* cited by examiner

| RANGE OF EXTERNAL ELECTRONIC DEVICE 1 FROM ELECTRONIC DEVICE | RANGE OF EXTERNAL ELECTRONIC DEVICE 2 FROM ELECTRONIC DEVICE | ACTION OF DEVICES |
|---|---|---|
| > R | > R | ACTION A |
| ≤ R | > R | ACTION B |
| > R | ≤ R | ACTION C |
| ≤ R | ≤ R | ACTION D |

INTERACTIVE CONTROL WITH RANGING AND GESTURING BETWEEN DEVICES

CROSS-REFERENCE TO RELATED APPLICATION AND CLAIM OF PRIORITY

This application claims priority under 35 U.S.C. § 119(e) to U.S. Provisional Patent Application No. 63/108,737 filed on Nov. 2, 2020 and U.S. Provisional Patent Application No. 63/153,099 filed on Feb. 24, 2021. The above-identified provisional patent applications are hereby incorporated by reference in its entirety.

TECHNICAL FIELD

This disclosure relates generally to electronic devices. More specifically, this disclosure relates to interactive control of electronic devices based on ranging and gesturing.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing.

Methods for interacting with and controlling computing devices are continually improving in order to conform to more natural approaches. Various types of computing devices utilize graphical user interfaces (GUI) on a display screen to facilitate control by a user. Objects such as text, images, and video are displayed on a screen and the user can employ various instruments to control the computing device such as, a keyboard, a mouse, a touchpad. Many such methods for interacting with and controlling a computing device generally require a user to physically touch the screen or utilizing an instrument such as a keyboard or mouse to provide a quick and precise input. Touching the screen or using particular instrument to interact with an electronic device can be cumbersome.

SUMMARY

This disclosure provides interactive control with ranging and gesturing between devices.

In a first embodiment, a method for operating an electronic device is provided. The method includes transmitting signals, via a transceiver to an external electronic device. The method also includes receiving signals, via the transceiver, from the external electronic device. The method further includes generating location information of the external electronic device relative to the electronic device based on a differences between the transmitted signals and the received signals. Additionally the method includes determining an action for changing a state on at least one of the electronic device or the external electronic device based on the location information. in response to determining that the action is associated with the electronic device, the method includes performing the action. in response to determining that the action is associated with the external electronic device, the method includes sending an instruction to the external electronic device to perform the action.

In another embodiment, an electronic device is provided. The electronic device includes a transceiver and a processor. The processor is configured to transmit signals, via the transceiver to an external electronic device. The processor is also configured to receive signals, via the transceiver, from the external electronic device. The processor is further configured to generate location information of the external electronic device relative to the electronic device based on a differences between the transmitted signals and the received signals. Additionally, the processor is configured to determine an action for changing a state on at least one of the electronic device or the external electronic device based on the location information. In response to determining that the action is associated with the electronic device, the processor is configured to perform the action. In response to determining that the action is associated with the external electronic device, the processor is configured to send an instruction to the external electronic device to perform the action.

In yet another embodiment a non-transitory computer readable medium embodying a computer program is provided. The computer program comprising computer readable program code that, when executed by a processor of an electronic device, causes the processor to: transmit signals, via a transceiver to an external electronic device; receive signals, via the transceiver, from the external electronic device; generate location information of the external electronic device relative to the electronic device based on a differences between the transmitted signals and the received signals; determine an action for changing a state on at least one of the electronic device or the external electronic device based on the location information; in response to determining that the action is associated with the electronic device, perform the action; and in response to determining that the action is associated with the external electronic device, send an instruction to the external electronic device to perform the action.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
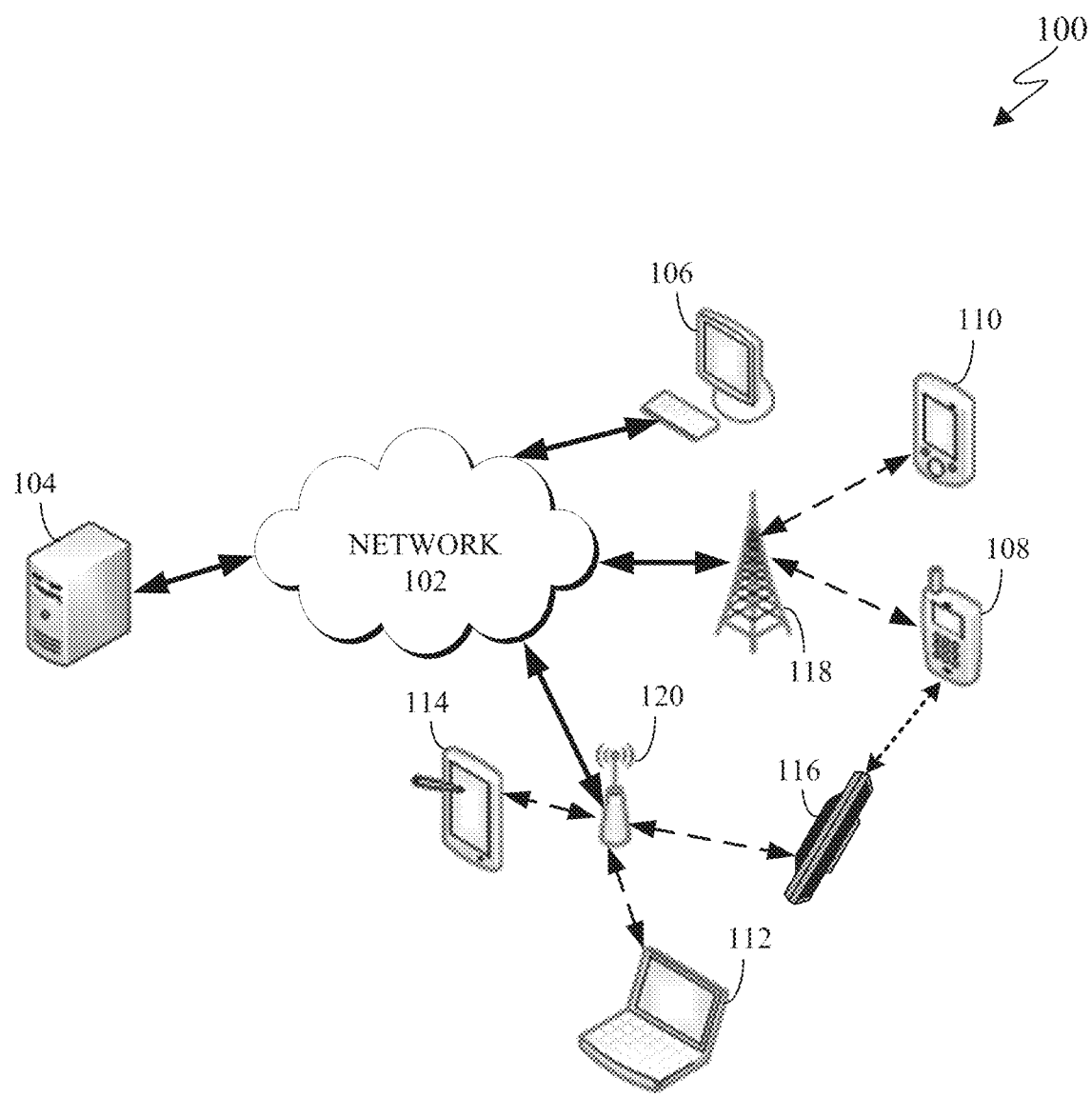
FIG. 1 illustrates an example communication system according to embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Certain electronic devices include a graphical user interface (GUI) such as a display that allows a user to view information displayed on the display in order to interact with the electronic device. Electronic devices can also include a user input device, such as keyboard, a mouse, a touchpad, a camera, among others. The various types of input devices allow a user to interact with the electronic device. The input devices can be operably connected to the electronic device via a wired or wireless connection. Certain electronic devices can also include a combination of a user input device and a GUI, such as a touch screen. Touch screens allow a user to interact with the electronic device via touching the display screen itself.

An example input device is a remote control, which can be used to enables a user to wirelessly control another electronic device, such as a television. For example, when a user presses a button on a remote control, the remote control can send a signal, that includes instructions corresponding to the particular button that was pressed, to the television. The instructions instruct the television to perform the particular action corresponding to the pressed button.

Embodiments of the present disclosure recognize and take into consideration that input devices can be cumbersome to use. For example, if the remote control is misplaced, the user is unable to control the television. Additionally, many households include multiple televisions where each television can have a corresponding remote control with unique input button placements. As such, a user often memorizes the button placements on each remote for ease of controlling each television without needlessly inspecting the remote to perform simply functions such as changing a channel, adjusting the volume, controlling playback, and the like.

Accordingly, embodiments of the present disclosure provide user interface mechanisms and methods in which the user can interact with the electronic device while not necessarily touching the proprietary input device of an electronic device. For example, embodiments of the present disclosure provide systems and methods for controlling an electronic device based on a location of another device relative to the electronic device. For another example, embodiments of the present disclosure provide systems and methods for gesture recognition as an input for controlling an electronic device. A gesture refers to detected movements of an external object, over a period of time, that is used to control the electronic device. For example, a gesture can be the detected movement of a body part of the user, such as the hand or fingers of a user, or another electronic device, which is used to control the electronic device (without the user touching the device or an input device).

Embodiments of the present disclosure recognize and take into consideration that gestures can be used to control an electronic device, such as a television. However, gesture control, using a camera (such as a red-green-blue (RGB) camera or an RGB-depth (RGB-D) camera) can lead to privacy concerns, since the camera would effectively by monitoring the users constantly in order to identify a gesture. Additionally. camera-based gesture recognition solutions do not work well in all lighting condition, such as when there is insufficient ambient light.

Embodiments of the present disclosure provide user interface mechanisms and methods in which the user can interact with the electronic device, such as a television, based on presence and/or position detection & tracking of one or more other devices, such as a smart phone or wearable device. For example, if the electronic device (such as the television) and the other device (such as a wearable device) are both capable for wireless communication (such as using ultra-wide band (UWB) signals, BLUETOOTH, radar, WiFi, and the like), then the television can determine a relative location of the other device. The television can then determine an action to perform based on the relative location of the other device and/or gesture performed by the other device. Additionally, the television can determine an action to be performed on the other device based on the relative location of the other device and/or gesture performed by the other device.

In certain embodiments, the television can use UWB signals for determining the relative location of the other device. UWB signals enable an electronic device to obtain centimeter (cm) level ranging (the error in distance measurements between two electronic devices can be less than 10 cm in line-of-sight cases, and less than 50 cm in non-line-of-sight cases) and angle detection (with an error that is less than 3° in line-of-sight cases). It is noted that before ranging or position detection, the devices may already be discovered via a device discovery protocol that can be also UWB based or can be based on other wireless connectivity technology such as Bluetooth or Wi-Fi.

Embodiments of the present disclosure include systems and methods for determining, at a first electronic device (such as the television), a range and angle of arrival (AOA) measurement of a second electronic device (such as a phone) with respect to the first electronic device. The range and AOA measurement can be performed as a single instance or a combination of instances over a period of time. The combination of instances represents a gesture.

Embodiments of the present disclosure also include systems and methods for identifying and performing an action selected from a plurality of actions. The identified action can change the state on either the first electronic device (such as the television) or the second electronic device (such as a phone) based on the range and AOA measurement. In certain embodiments, the plurality of actions include performing authentication on the first electronic device, performing power savings on the first electronic device, initiating content playback, or controlling characteristics of content playback, and the like.

While the descriptions of the embodiments of the present discloser, describe UWB as the wireless technology for generating location information, similar technologies that be used (such as radar, WiFi, BLUETOOTH, and the like) to identify the relative location of external devices. That is, the embodiments of the present disclosure are not restricted to UWB and can be applied to other types of sensors that can provide both range and AOA measurements. It is noted that when applying the embodiments of the present disclosure using a different type of sensor (a sensor other than a measuring transceiver), various components may need to be tuned accordingly. Additionally, while this disclosure primarily uses a television as the primary electronic device (the first electronic device), and a phone or a watch as the external electronic device, it is noted that other device types can be applicable as well, such as a refrigerator with display panel, smart speaker, and the like.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102.

Each of the client devices 106-116 represent any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a television 116. However, any other or additional client devices could be used in the communication system 100, such as a wearable device or an appliance. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the television 116 communicate via one or more wireless access points 120, such as IEEE 802.11 wireless access points. Note that these are for illustration only and that each of the client devices 106-116 could communicate directly with the network 102 or indirectly with the network 102 via any suitable intermediate device(s) or network(s). In certain embodiments, any of the client devices 106-116 transmit information securely and efficiently to another device, such as, for example, the server 104.

In certain embodiments, any of the client devices 106-116 can emit and receive UWB signals via a measuring transceiver. As illustrated, the television 116 and the mobile device 108 communicate via UWB signals. For example, the television 116 can transmit a UWB signal that is time stamped to the mobile device 108. In response, the mobile device 108 transmits a time stamped UWB signal back to the television 116. The television 116 can then generate location information, indicating a location of the mobile device 108 relative to itself (the television 116). The location information can include distance between the television 116 and the mobile device 108. Additionally, the location information can indicate angle features, such AOA measurements of the received UWB signals of the mobile device 108. Based on the AOA measurements, the television 116 can determine an angle (in azimuth, elevation, or both) that the mobile device 108 is, relative to itself (the television 116).

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
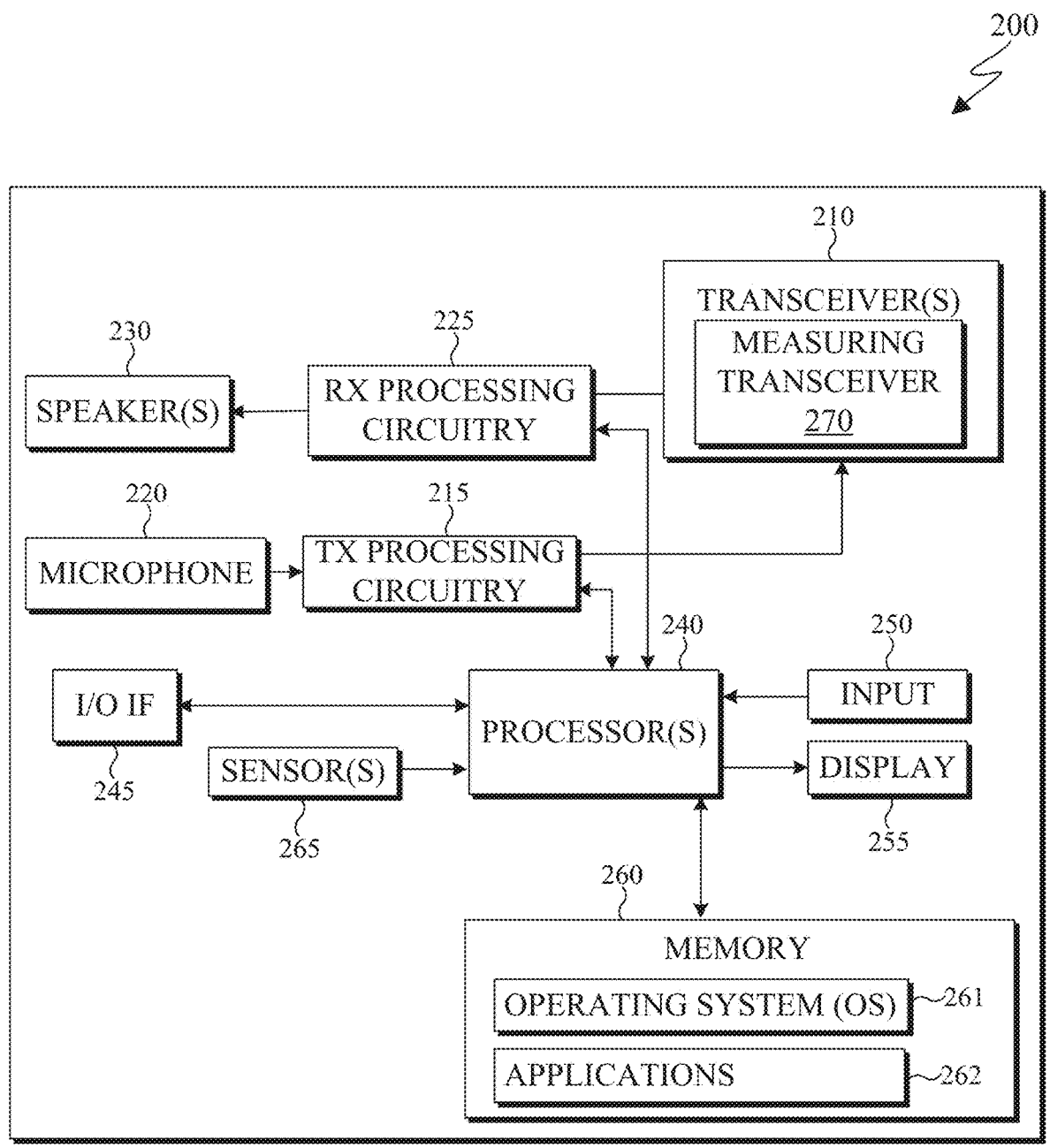
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-116 in FIG. 1. The electronic device 200 can be a TV, such as the television 116 of FIG. 1. In other embodiments, the electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. As illustrated the transceiver 210 also includes a measuring transceiver 270. The measuring transceiver 270 is discussed in greater detail below.

The transceiver(s) 210 transmits and receives a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-116. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the measuring transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is the measuring transceiver 270. The measuring transceiver 270 is configured to transmit and receive signals for detecting and ranging purposes. The measuring transceiver 270 can transmit and receive signals for measuring range and angle of an external object relative to the electronic device 200. The measuring transceiver 270 may be any type of transceiver including, but not limited to a WiFi transceiver, for example, an 802.1 lay transceiver, a UWB transceiver, and the like. In certain embodiments, the measuring transceiver 270 includes a sensor. For example, the measuring transceiver 270 can operate both measuring and communication signals concurrently. The measuring transceiver 270 includes one or more antenna arrays, or antenna pairs, that each includes a transmitter (or transmitter antenna) and a receiver (or receiver antenna). The measuring transceiver 270 can transmit signals at a various frequencies, such as in UWB. The measuring transceiver 270 can receive the signals from an external electronic device.

The transmitter, of the measuring transceiver 270, can transmit UWB signals. The receiver, of the measuring transceiver, can receive UWB signals from other electronic devices. The processor 240 can analyze the time difference, based on the time stamps of transmitted and received signals, to measure the distance of the target objects from the electronic device 200. Based on the time differences, the processor 240 can generate location information, indicating a distance that the external electronic device is from the electronic device 200. In certain embodiments, the measuring transceiver 270 is a sensor that can detect range and AOA of another electronic device. For example, the measuring transceiver 270 can identify changes in azimuth and/or elevation of the other electronic device relative to the measuring transceiver 270.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
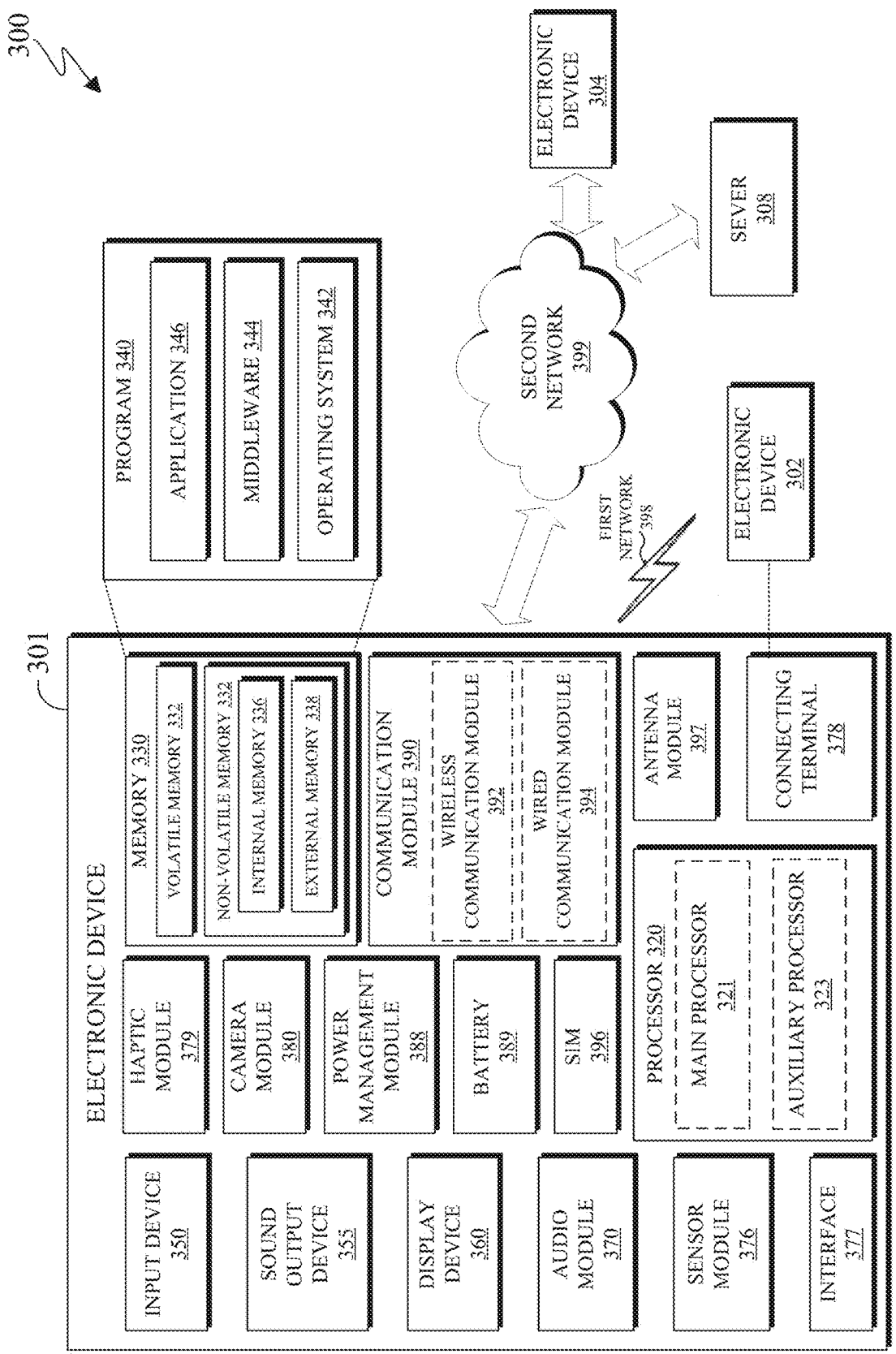
FIG. 3 illustrates an example network configuration according to embodiments of the present disclosure.

FIG. 3 illustrates an example network configuration according to embodiments of the present disclosure. An embodiment of the network configuration shown in FIG. 3 is for illustration only. One or more of the components illustrated in FIG. 3 can be implemented in specialized circuitry configured to perform the noted functions or one or more of the components can be implemented by one or more processors executing instructions to perform the noted functions.

FIG. 3 illustrated a block diagram illustrating a network configuration including an electronic device 301 in a network environment 300 according to various embodiments. As illustrated in FIG. 300, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 and/or the second network 399 can be similar to the network 102 of FIG. 1. The electronic devices 301, 302, and 304 can be similar to any of the client devices 106-116 of FIG. 1 and include similar components to that of the electronic device 200 of FIG. 2. The server 308 can be similar to the server 104 of FIG. 1.

The electronic device 301 can be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320 and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334.

According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software. The program 340 may include, for example, an operating system (OS) 342, middleware 344, or an application 346.

The input device 350 may receive a command or data to be used by other components (e.g., the processor 320) of the electronic device 301, from the outside (e.g., a user) of the electronic device 301. The input device 350 may include, for example, a microphone, a mouse, a keyboard, or a digital pen (e.g., a stylus pen).

In certain embodiments, the input device 350 can include a sensor for gesture recognition. For example, the input device 350 can include a transceiver similar to the measuring transceiver 270 of FIG. 2.

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, or projector. According to an embodiment, the display device 360 may include touch circuitry adapted to detect a touch, or sensor circuitry (e.g., a pressure sensor) adapted to measure the intensity of force incurred by the touch. The display device 360 can be similar to the display 255 of FIG. 2.

The audio module 370 may convert a sound into an electrical signal and vice versa. According to an embodiment, the audio module 370 may obtain the sound via the input device 350, output the sound via the sound output device 355, or output the sound via a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 376 can be similar to the sensors 265 of FIG. 2.

The interface 377 may support one or more specified protocols to be used for the electronic device 101 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication.

According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as BLUETOOTH, wireless-fidelity (Wi-Fi) direct, UWB, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB).

According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 may perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Although FIG. 3 illustrates one example of the electronic device 301 in the network environment 300, various changes can be made to FIG. 3. For example, various components in FIG. 3 can be combined, further subdivided, or omitted and additional components can be added according to particular needs. As a particular example, the processor 320 can be further divided into additional processors, such as one or more central processing units (CPUs), one or more graphics processing units (GPUs), one or more neural networks, and the like. Also, while FIG. 3 illustrates the electronic device 301 configured as a mobile telephone, tablet, or smartphone, the electronic device 301 can be configured to operate as other types of mobile or stationary devices.

Figure 4A:
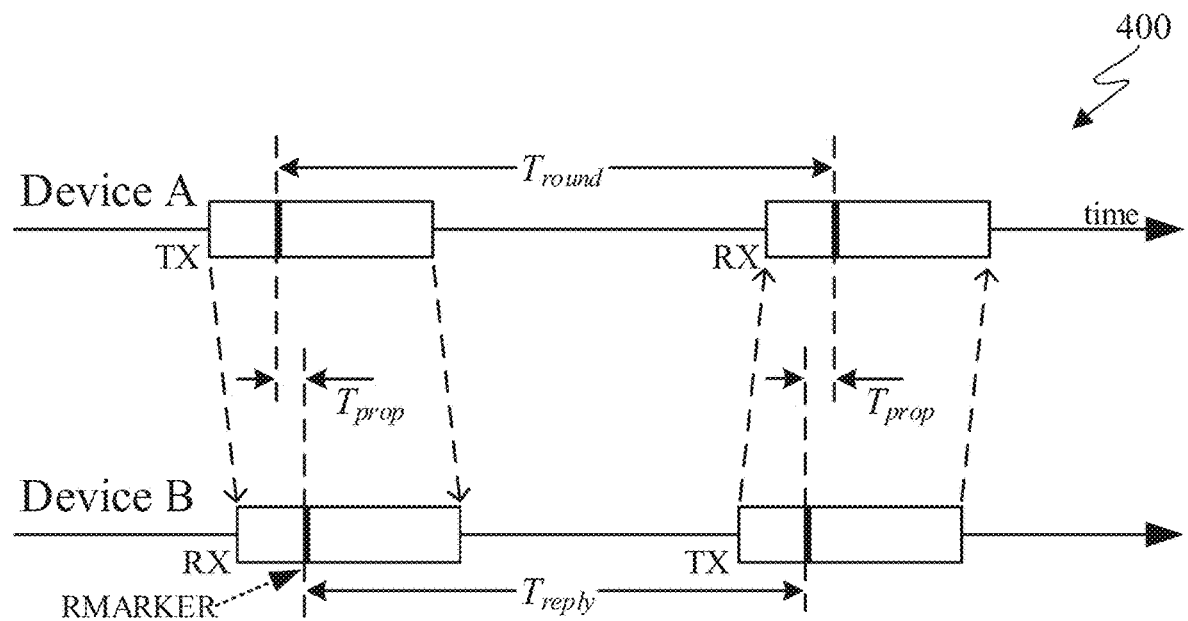
FIGS. 4A and 4B illustrate two way ranging according to embodiments of the present disclosure.
Figure 4B:
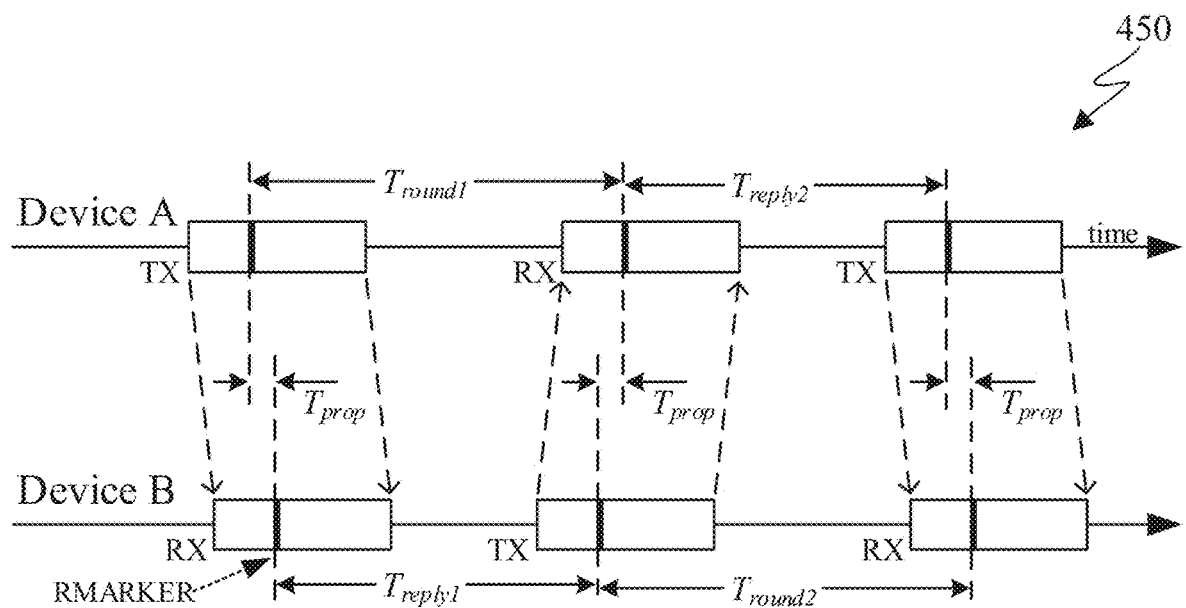

FIGS. 4A and 4B illustrate two way ranging (TWR) according to embodiments of the present disclosure. In particular, FIG. 4A illustrates an embodiment 400 of single sided two way ranging (SS-TWR) according to embodiments of the present disclosure. FIG. 4B illustrates an embodiment 450 of double sided two way ranging (DS-TWR) according to embodiments of the present disclosure. That is, the TWR of FIGS. 4A and 4B describe how an electronic device (such as a first electronic device, similar to the television 116 of FIG. 1) calculates a distance between itself and another electronic device. Any one of the client device 106-116 of FIG. 1 can include internal components that can perform single sided two way ranging, double sided two way ranging, or both single sided and double sided two way ranging.

Embodiments of the present disclosure provide systems and methods for using wireless technology to determine a location (such as distance or range feature) of another device relative to a primary or first device. An example of an outdoor localization technology is the Global Positioning System (GPS). Examples of wireless technologies that can be used in indoor localization include Wi-Fi (e.g. Wi-Fi based positioning system/WPS), Bluetooth, and UWB, and the like.

One localization technique is trilateration. Trilateration is a method of determining the location of a device (called tag) in space, using the ranges (distances) measurements between the tag and multiple spatially separated anchors with known locations. The ranges between the tag and the anchors can be determined using two way ranging (TWR) between the tag and each of the anchors. Based on the determined ranges between the tag and the multiple anchors the location of the tag is determined.

Range features are the range measurements between two devices equipped with a certain signaling capability such as by transmitting and receiving signals in UWB. Using UWB, the round-trip time of a signal sent between two devices are measured with the precision in the order of nanoseconds, then the range values between the two devices can be determined, since the speed is known. High ranging accuracy is obtained by using high precision in the time measurements. For example, ranging error can be less than 10 cm when the two devices are within line-of-sight. Other wireless signals can be used to obtain range values. For example, an electronic device can determine distance using received signal strength indication (RSSI) in WiFi. In this case, the range values can be determined through a mapping from a measurable quantity, such as signal strength. Embodiments of the present disclosure take into consideration that while such mapping (such as by using signal strength) can be a reasonable indicator of distance between devices (signal strength is smaller when the distance between two devices is greater than 10 meters than when this distance is smaller than 10 meters), it is difficult to have an exact mapping or distance (such as the ability to identify a distance between the two devices when the measured signal strength is 10 dB) because the signal strength is highly dependent on other aspects, such as hardware difference, multipaths in the environment, and the like.

The embodiment 400 of FIG. 4A and the embodiment 450 of FIG. 4B illustrate two devices (device A and device B) exchanging signals using UWB for determining the distance between the devices.

As illustrated in the embodiment 400 of FIG. 4A, two devices, that of device A and device B, perform SS-TWR. It is noted that device A and device B can be any of the client devices 106-116 of FIG. 1 and include any internal components of the electronic device 200 of FIG. 2 or the electronic device 301 of FIG. 3. For example, device A can be a television 116 and device B can be the mobile device 108, as illustrated in FIG. 1. In certain embodiments, device A and device B (of FIGS. 4A and 4B) can include a transceiver, such as the measuring transceiver 270 of FIG. 2, for transmitting and receiving messages.

SS-TWR is performed to measure the round trip delay of a single message from the initiator to the responder and a response sent back to the initiator. In particular, the device A initiates the exchange of signals and the device B responds to complete the exchange to perform a SS-TWR. Each device precisely timestamps the transmission and reception times of the message frames. Based on the timestamps, device A, device B, or both devices A and B can calculate times $T_{round}$ and $T_{reply}$ and then by using Equation (1), below, determine the resulting time-of-flight.

$$\hat{T}_{prop} = \frac{1}{2}(T_{round} - T_{reply}) \qquad (1)$$

As illustrated in the embodiment 450 of FIG. 4B, two devices, that of device A and device B, perform DS-TWR. It is noted that device A and device B can be any of the client devices 106-116 of FIG. 1. For example, device A can be a television 116 and device B can be the mobile device 108, as illustrated in FIG. 1.

DS-TWR reduces the estimation error induced by clock drifts from long response delays of the SS-TWR. For example, the embodiment 450 of FIG. 4B, illustrates three messages are used for reducing the estimation error induced by clock drift from long response delays. Device A is the initiator to initialize the first round trip measurement, while device B as the responder, both responds to complete the first round trip measurement, and initializes the second round trip measurement. Each device precisely timestamps the transmission and reception times of the messages. Based on the time stamps a resultant time-of-flight estimate, $T_{prop}$, can be identified, such as by using Equation (2), below:

$$\hat{T}_{prop} = \frac{(T_{round1} \times T_{round2} - T_{reply1} \times T_{reply2})}{(T_{round1} + T_{round2} + T_{reply1} + T_{reply2})} \qquad (2)$$

A range (such as a distance) between the device A and device B, can be identified using the resultant time-of-flight estimate from SS-TWR (of the embodiment 400 of FIG. 4A) or DS-TWR (of the embodiment 440 of FIG. 4B). Equation (3), below, describes identifying the distance between the device A and device B. In Equation (3), R is the range estimate, $\hat{T}_{prop}$ is the value identified in Equation (1) or Equation (2), and c is the speed of light.

$$R = \hat{T}_{prop} \times c \qquad (3)$$

Figure 5A:
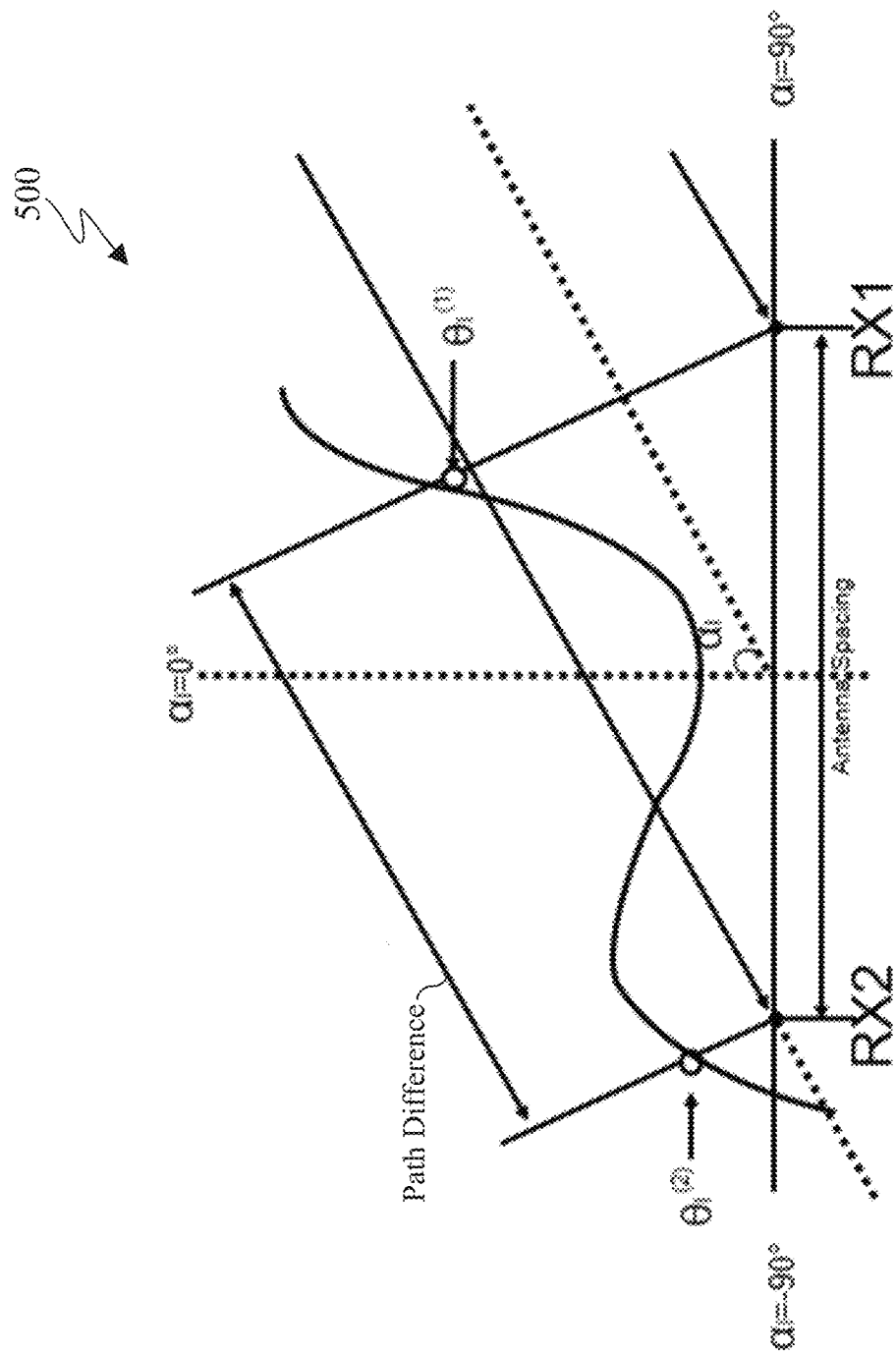
FIG. 5A illustrates an embodiment of an electronic device identifying angle of arrival (AOA) measurements of signals from an external electronic device according to embodiments of the present disclosure.
Figure 5B:
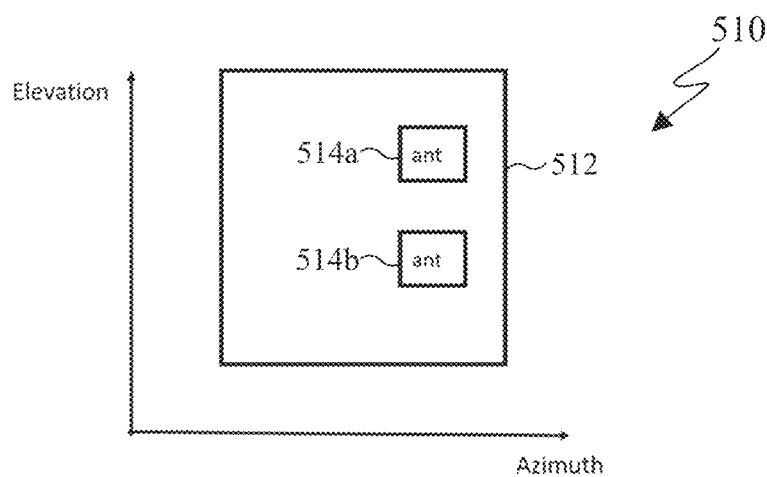
FIGS. 5B, 5C, and 5D illustrate embodiments depicting example antenna placements according to embodiments of the present disclosure.
Figure 5C:
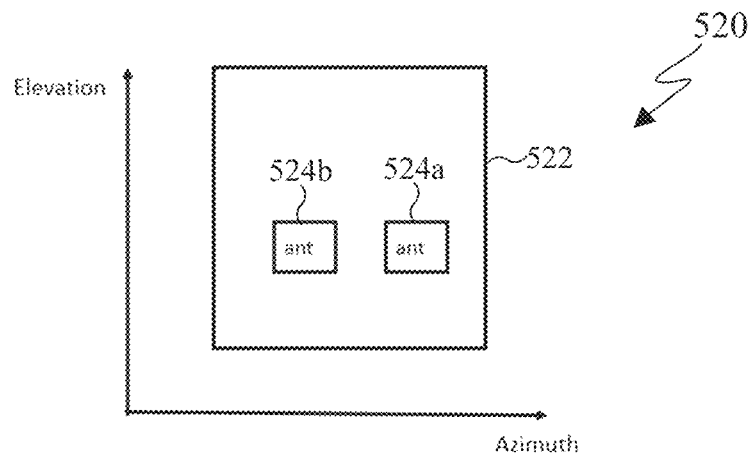
Figure 5D:
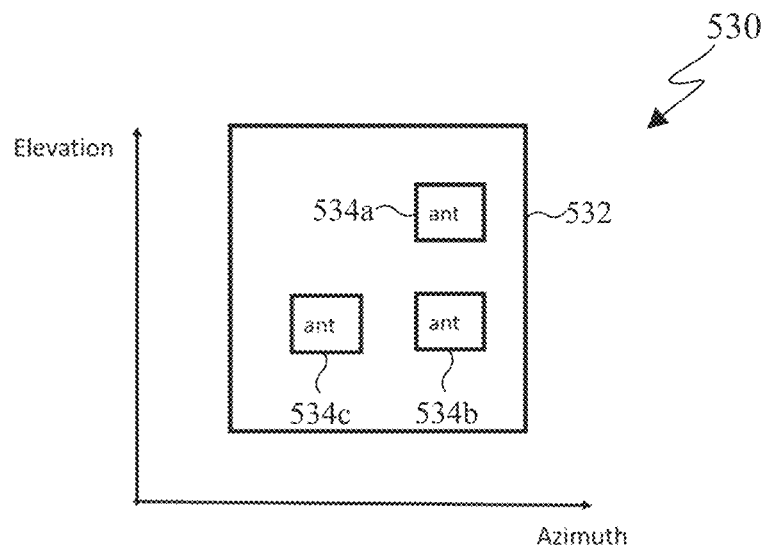
Figure 5E:
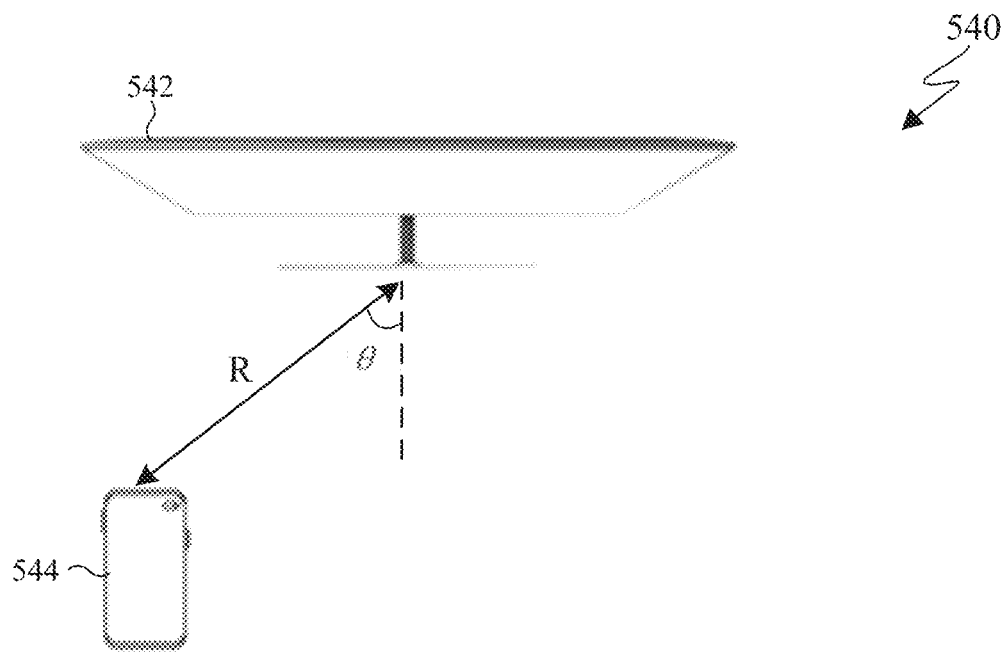
FIG. 5E illustrates a diagram of an example position of an external electronic device relative to an electronic device in two-dimensions according to embodiments of the present disclosure.
Figure 5F:
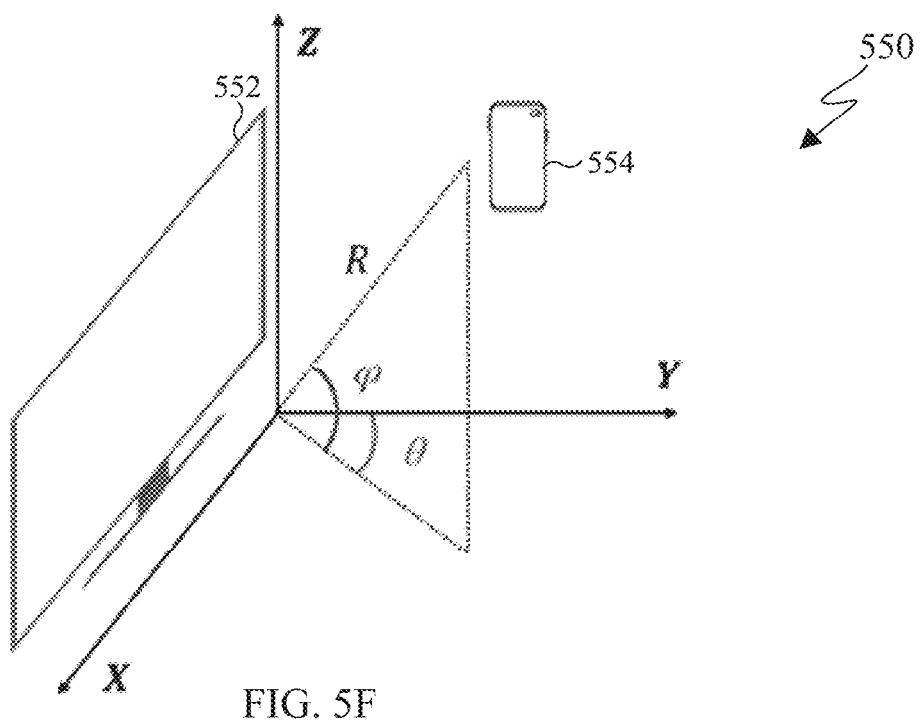
FIG. 5F illustrates a diagram of an example position of an external electronic device relative to an electronic device in three-dimensions according to embodiments of the present disclosure.

FIGS. 5A-5F describe the ability to use various antenna positions for enabling an electronic device to identify a relative angle between itself and another electronic device. In particular, FIG. 5A illustrates an embodiment 500 of an electronic device identifying AOA measurements of signals from an external electronic device according to embodiments of the present disclosure. FIGS. 5B, 5C, and 5D illustrate embodiments 510, 520, and 530, respectively, depicting example antenna placements according to embodiments of the present disclosure. FIG. 5E illustrates a diagram 540 of an example position of an external electronic device relative to an electronic device in two-dimensions according to embodiments of the present disclosure. FIG. 5F illustrates a diagram 550 of an example position of an external electronic device relative to an electronic device in three-dimensions according to embodiments of the present disclosure. Any one of the client device 106-116 of FIG. 1 and can include internal components for identifying angle features as described in FIGS. 5A-5F. For example, a client device can identify angle features by using a transceiver, such as the measuring transceiver 270 of FIG. 2, with two or more antennas.

In addition to range (or distance), angle features are used to identify a location of an external electronic device. As described above in FIGS. 4A and 4B, range represents the distance an external device (such as the mobile device 108 of FIG. 1) is from a primary electronic device (such as the television 116 of FIG. 1).

Angle features, such as AOA, indicates a relative angle that the external device (such as the mobile device 108 of FIG. 1) is from a first electronic device (such as the television 116 of FIG. 1). AOA features are the angle-of-arrival measurements of the second device with respect to the first device, and available when the first device has multiple UWB antennas. For a pair of antennas, the phase difference of the signal coming to each antenna from the second device can be measured, and then be used to determine the AOA of the second device. In certain embodiments, an electronic device can be equipped with two pairs of antennas to measure both azimuth and elevation angles. In particular, one pair of antennas is placed in the horizontal direction to measure the angle of arrival in the horizontal plane, (denoted as the azimuth angle). The other pair of antennas is placed in the vertical direction to measure the angle of arrival in the vertical plane (denoted as the elevation angle).

As illustrated in the embodiment 500 of FIG. 5A, the phase difference among antennas is used to extract the AOA information from UWB measurements. For example, AOA is calculated based on the phase difference of between the two antennas, that of RX1 and RX2. The distance between the two antennas is fixed and described by Equation (4), below. In Equation (4), λ is the wavelength and β is a normalization factor to link the distance d and wavelength λ. In certain embodiments, $$d < \frac{\lambda}{2}$$

and β<1. Thereafter, the AOA $\alpha_l$ is identified using the measured phase difference between two antennas. The phase difference $\Delta\theta_l$ and the AOA $\alpha_l$ satisfy the relationship as described in Equation (5), below.

$$d = \frac{\beta\lambda}{2} \quad (4)$$

$$\Delta\theta_l = \theta_l^{(2)} - \theta_l^{(1)} = \pi\beta\sin(\alpha_l) \quad (5)$$

FIG. 5B illustrates antenna orientations of a transceiver 512 for identifying the elevation AOA. The transceiver 512 can be similar to the measuring transceiver 271 of FIG. 2. For example, to identify the elevation AOA, the phase difference of the two antennas (antenna 514a and antenna 514b of FIG. 5B) are placed in the elevation direction, as illustrated.

FIG. 5C illustrates antenna orientations of a transceiver 522 for identifying the azimuth AOA. The transceiver 522 can be similar to the measuring transceiver 271 of FIG. 2. For example, to identify the azimuth AOA, the phase difference of the two antennas (antenna 524a and antenna 524b of FIG. 5C) are placed in the azimuth direction, as illustrated.

FIG. 5D illustrates antenna orientations of a transceiver 532 for identifying the azimuth AOA and the elevation AOA. The transceiver 532 can be similar to the measuring transceiver 271 of FIG. 2. For example, to identify the elevation AOA, the phase difference of the two antennas (antenna 534a and antenna 534b of FIG. 5D) are placed in the elevation direction and to identify the azimuth AOA, the phase difference of the two antennas (such as the antenna 534b and the antenna 534c of FIG. 5D) are placed in the azimuth direction, as illustrated.

As illustrated in FIG. 5E, the television 542, (such as the television 116 of FIG. 1) can determine location information of the electronic device 544 (such as the mobile device 108 of FIG. 1), which can be represented, in two dimensional (2D) coordinate system. For example, the location information of the electronic device 544 can be based on the range and the angle (R, θ) from the reference point television 542 to the reference point of the electronic device 544. The range, R, is the distance between the television 542 and the electronic device 544. The angle θ is defined as the angle between the vector from the television's 542 reference point to the electronic device 544 and its projection onto the vertical plane perpendicular to the TV's screen. For another example, the location information of the electronic device 544 can be represented by (x, y) in Cartesian coordinate system, where the television 542 is the reference location designated as (0, 0). Further, the tracking of the device with respect to the TV over a period of time is a gesture.

In certain embodiments, the first device, such as the television 542 can determine the relative location of the electronic device 544. Based on the relative location of the electronic device 544, the television 542 can determine whether the electronic device 544 is within or outside a designated area. Based on the determination, the television 542 can identify a particular action to perform. Similarly, the television 542 can determine whether the electronic device 544 performs a gesture and thereafter identify a particular action to perform. The action can be performed on the television 542 and/or the television 542 can notify the electronic device 544 to perform the identified action.

As illustrated in FIG. 5F, the television 552, (such as the television 116 of FIG. 1) can determine location information of the electronic device 554 (such as the mobile device 108 of FIG. 1), which can be represented, in three dimensional (3D) coordinate system. For example, the location information of the electronic device 554 can be represented by (R, θ, φ), where θ and φ are the azimuth and elevation angles, respectively. Here given $\overrightarrow{OT}$ represents the vector from the television's reference point to the other device, the angle θ is defined as the angle between $\overrightarrow{OT}$ and its projection onto the vertical plane perpendicular to the TV's screen, the angle φ is defined as the angle between $\overrightarrow{OT}$ and its projection onto the horizontal plane perpendicular to the TV's screen. For another example, the location information of the electronic device 554 can be represented by (x, y, z) in Cartesian coordinate system. Further, the tracking of the device with respect to the TV over time can be recognized as gestures to control functions on an electronic device.

In certain embodiments, the first device, such as the television 552 can determine the relative location of the electronic device 554. Based on the relative location of the electronic device 554, the television 552 can determine whether the electronic device 554 is within or outside a designated area. Based on the determination, the television 552 can identify a particular action to perform. Similarly, the television 552 can determine whether the electronic device 554 performs a gesture and thereafter identify a particular action to perform. The action can be performed on the television 552 and/or the television 552 can notify the electronic device 554 to perform the identified action.

Figure 6A:
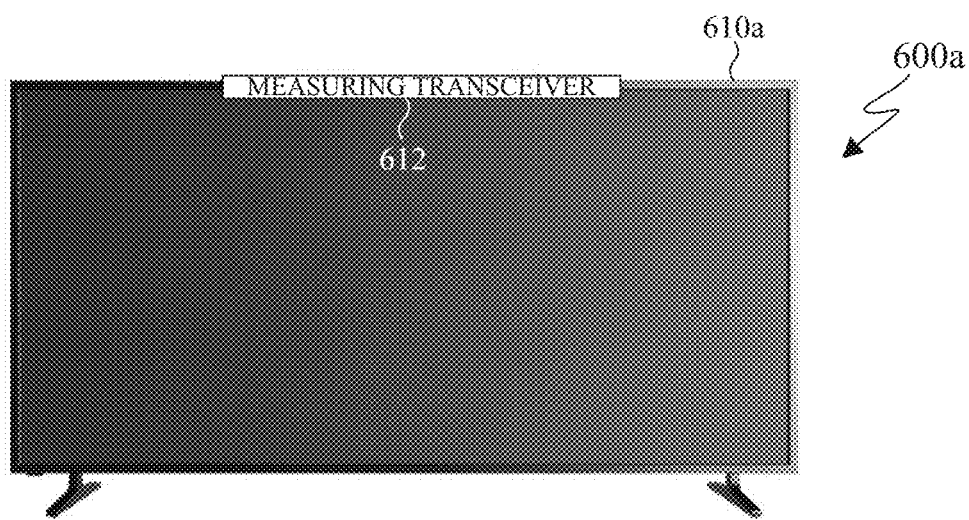
FIGS. 6A, 6B, and 6C illustrate example placements of the transceiver according to embodiments of the present disclosure.
Figure 6B:
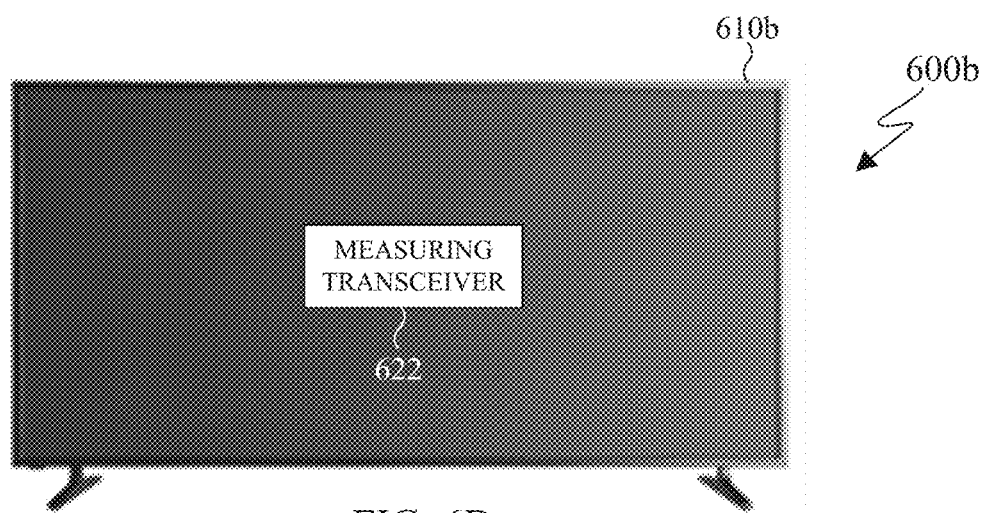
Figure 6C:
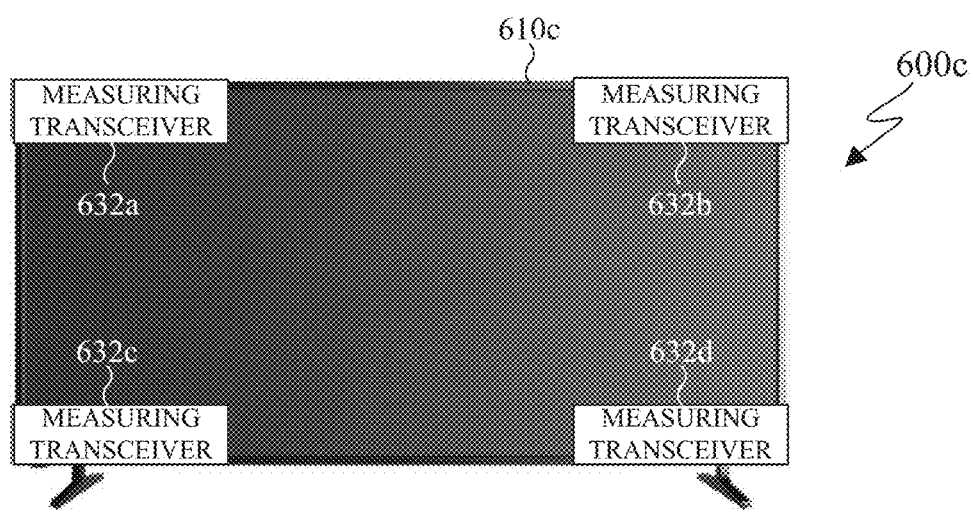

FIGS. 6A, 6B, and 6C illustrate example placements of the antennas according to embodiments of the present disclosure.

FIG. 6A illustrates the electronic device 610a. FIG. 6B illustrates the electronic device 610b. FIG. 6C illustrates the electronic device 610c. The electronic devices 610a, 610b, and 610c (collectively electronic device 610) can be any of the client devices 106-116 of FIG. 1 and include any internal components of the electronic device 200 of FIG. 2 or the electronic device 301 of FIG. 3. For example, electronic device 610 can be similar to the television 116.

The electronic device 610 can include one or more measuring transceiver, such as the measuring transceiver 270 of FIG. 2, for transmitting and receiving messages. In certain embodiments, the one or more measuring transceiver of the electronic device 610 can be a UWB transceiver. The following embodiments are examples of the electronic devices 610 are not intended to limit the number of measuring transceivers or locations of the measuring transceivers.

As illustrated in the embodiment 600a of FIG. 6A, a single measuring transceiver 612 is positioned at the along the top perimeter of the electronic device 610a. Similarly, as illustrated in the embodiment 600b of FIG. 6B, a single measuring transceiver 622 is positioned near the middle of the electronic device 610b.

As illustrated in the embodiment 600c of FIG. 6C, multiple measuring transceivers (such as the measuring transceiver 632a, measuring transceiver 632b, measuring transceiver 632c, and measuring transceiver 632d) (collectively measuring transceivers 632) are positioned at various locations within the electronic device 610c. In certain embodiments, ranging can be performed between each of the measuring transceivers 632 (anchor) and an external electronic device, such as the mobile device 108 of FIG. 1. A location of the external electronic device can be identified based on the ranging between the multiple measuring transceivers 632.

In certain embodiments, other signal processing techniques can be used to localize an electronic device in a 3D space, such as multilateration. Multilateration is used to determine a devices location based on measuring time of arrivals of the signals. For example, multilateration can be used to estimate the 2D (x, y) or 3D location (x, y, z) of the electronic device, based on the relative location of the measuring transceivers 632. As illustrated, since there are two measuring transceiver in the horizontal direction (such as measuring transceiver 632a and 632b) and two measuring transceiver in the vertical direction (such as measuring transceiver 632a and 632c) the electronic device 610c can identify the 3D location of an external electronic device.

Figure 7A:
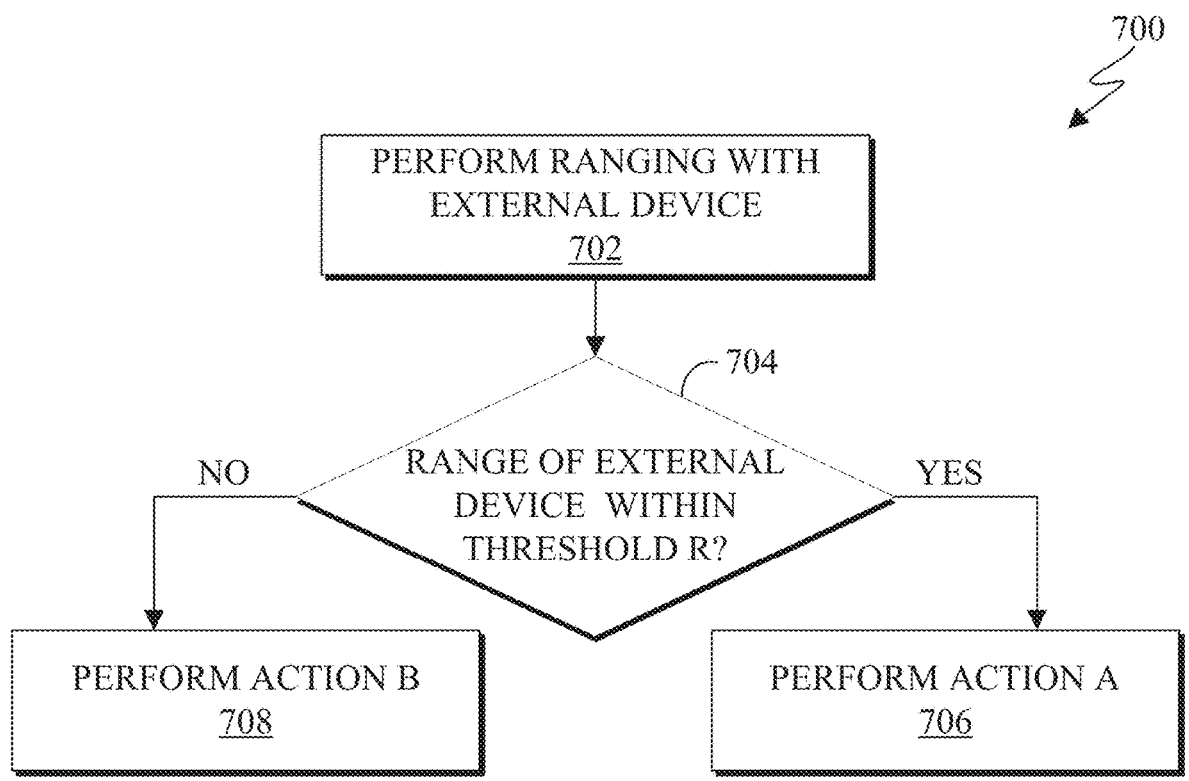
FIGS. 7A, 7B, and 7C illustrates examples for proximity based device control based on distance according to embodiments of the present disclosure.
Figure 7B:
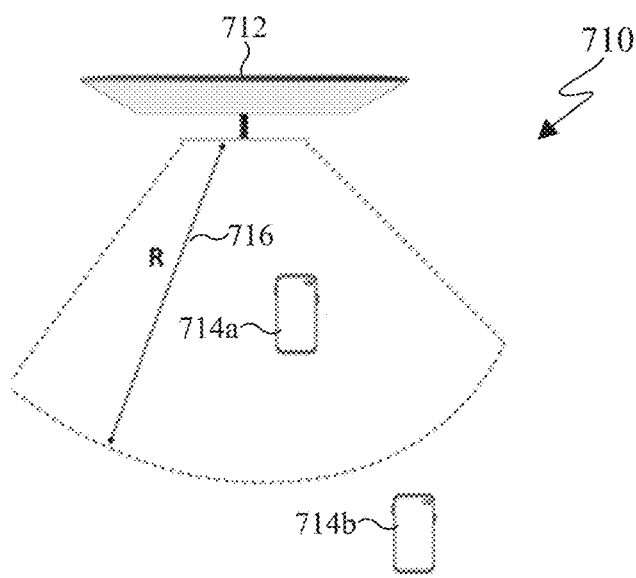
Figure 7C:
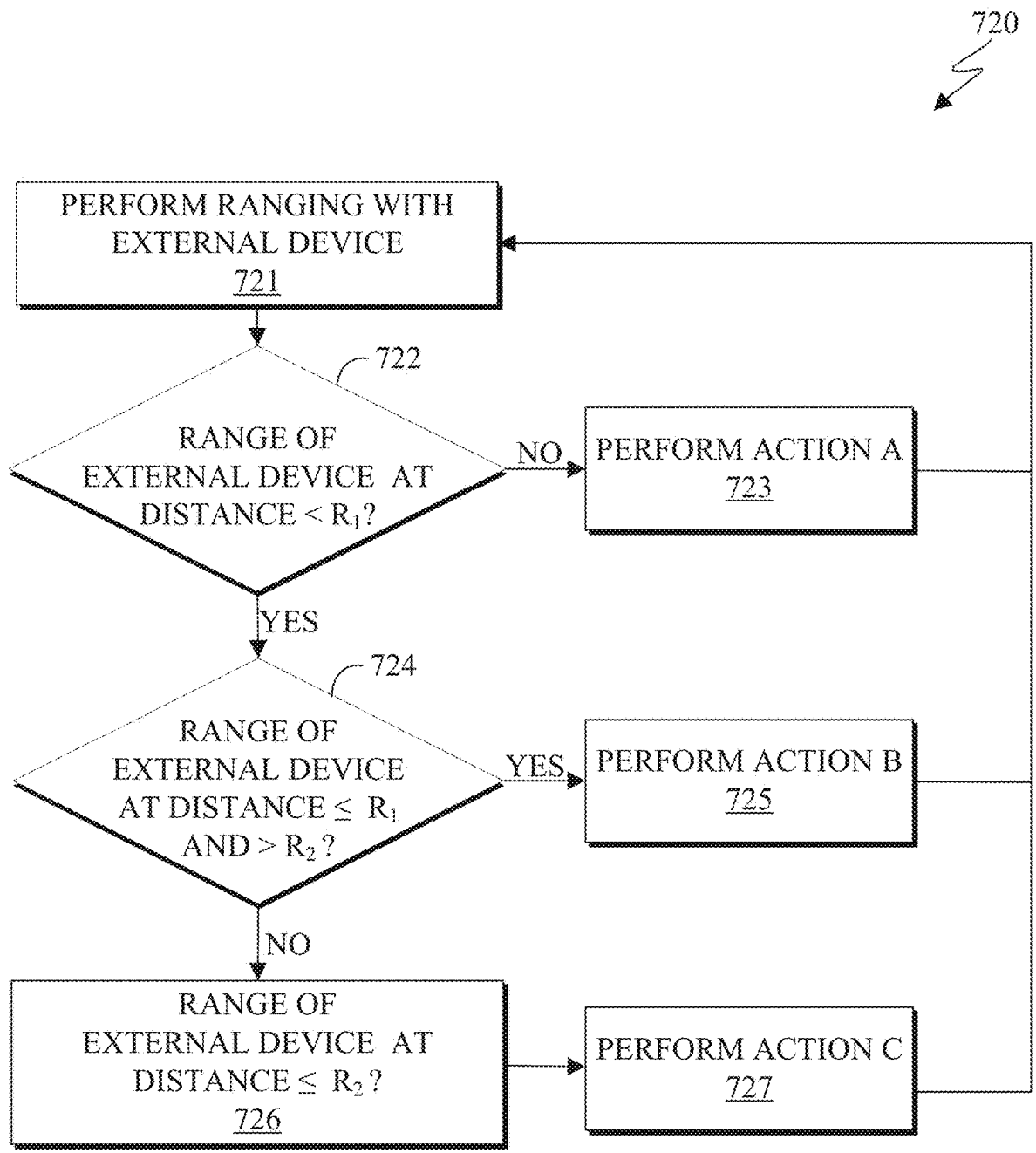

FIGS. 7A, 7B, and 7C illustrates examples for proximity based device control based on distance according to embodiments of the present disclosure. In particular, FIG. 7A illustrates an example method 700 for device control based on distance between the electronic devices according to embodiments of the present disclosure. FIG. 7B illustrates an example diagram 710 indicating different locations of an external electronic device relative to the electronic device according to embodiments of the present disclosure. FIG. 7C illustrates an example method 720 for device control based on multiple distance thresholds between the electronic devices according to embodiments of the present disclosure.

The methods 700 and 720 are described as implemented by any one of the client device 106-116 of FIG. 1 and can include internal components similar to that of electronic device 200 of FIG. 2 and the electronic device 301 of FIG. 3. However, the method 700 as shown in FIG. 7A and the method 720 as shown in FIG. 7B could be used with any other suitable electronic device and in any suitable system.

As illustrated in the method 700 of FIG. 7A, the diagram 710 of FIG. 7B, and the method 720 of FIG. 7C an electronic device, (such as the television 116 and the television 712 of FIG. 7B) determines an action to perform based on the location of another device (such as the mobile device 108 of FIG. 1 and the mobile devices 714a and 714b of FIG. 7B).

In step 702, the electronic device (such as the television 712 of FIG. 7B) performs ranging with another an external electronic device (such as the mobile devices 714a and 714b of FIG. 7B). For example, the electronic device and the external electronic device can include measuring transceivers, (such as the measuring transceiver 270 of FIG. 2) for performing the ranging, as described above in FIGS. 4A and 4B. In certain embodiments, the measuring transceivers are UWB transceivers. For example, the UWB transceiver on an electronic device can perform ranging with another UWB transceiver on another device that is within the radio range. The result of ranging provides the distance (such as in in meter) between the two UWB transceivers.

In step 704, the electronic device (such as the television 712 of FIG. 7B) determines whether the distance to the external electronic device (such as the mobile devices 714a and 714b of FIG. 7B) is beyond a threshold R. Based on the determination the electronic device performs action A of step 706 or action B of step 708.

Referring to FIG. 7B, the electronic device is the television 712 and the external electronic device is the mobile device 714a and 714b. As illustrated in the diagram 710 of FIG. 7B, the mobile device 714a is within the threshold R 716 from the television 712 while the mobile device 714b is outside the threshold R 716.

Referring to FIG. 7A, the electronic device (such as the television 712 of FIG. 7B) will perform action A (step 706) when the external electronic device is within the threshold R (such as illustrated by the mobile device 714a of FIG. 7B). Alternatively, the electronic device (such as the television 712 of FIG. 7B) will perform action B (step 708) when the external electronic device is outside the threshold R (such as illustrated by the mobile device 714b of FIG. 7B). The determined action (either action A of step 706 or action B of step 708) can include performing action or changing a state on the electronic device (such as the television 712) and/or instructing the external electronic device to perform an action.

In certain embodiments, the actual action performed, based on the ranging result, can also depend on the current state of the electronic device such as the television 712 and/or the external electronic device.

The method 720 of FIG. 7C illustrates using multiple ranging threshold to determine different actions. For example, there can be more one ranging result dependent actions, which provides more refined control. For example, $R_1$ can be 10 meter, $R_2$ can be 5 meter. Depending on whether the ranging result (distance between the electronic device and the external electronic device) is less than $R_1$, greater than or equal to $R_1$ and less than $R_2$, or greater than or equal to $R_2$, the electronic device (such as the television 712) can determine whether to perform Action A, Action B, or Action C, respectively, as illustrated in FIG. 7C. It is noted that ranging thresholds $R_1$ and $R_2$ are adjustable and can also be calibrated or configured by users or devices.

For example, in step 721 a first electronic device (such as the television 116 of FIG. 1 or the television 712 of FIG. 7B) performs ranging with a second electronic device (such as the mobile devices 108 of FIG. 1). For example, the first electronic device and the second electronic device can include measuring transceivers, (such as the measuring transceiver 270 of FIG. 2) for performing the ranging, as described above in FIGS. 4A and 4B. In certain embodiments, the measuring transceivers are UWB transceivers. The first electronic device can generate location information of the second electronic device. The location information can include range, an elevation angle, an azimuth angle, or any combination thereof.

In step 722, the first electronic device determines whether the identified distance (based on the generated location information) between the first electronic device and the second electronic device is less than a first ranging threshold. When the distance between the first electronic device and the second electronic device is less than the first ranging threshold, the first electronic device performs action A (step 723). Alternatively, when the distance between the first electronic device and the second electronic device is greater than or equal to the first ranging threshold, the first electronic device proceeds to step 724.

In step 724, the first electronic device determines whether the identified distance (based on the generated location information) between the first electronic device and the second electronic device is between the first ranging threshold and a second ranging threshold. When the distance between the first electronic device and the second electronic device is between the first ranging threshold and a second ranging threshold, the first electronic device performs action B (step 725). Alternatively, when the distance between the first electronic device and the second electronic device is smaller than or equal to the second ranging threshold, the first electronic device proceeds to step 726.

In step 726, the first electronic device determines whether the identified distance (based on the generated location information) between the first electronic device and the second electronic device is equal to or smaller than the second ranging threshold. When the distance between the first electronic device and the second electronic device is equal to or smaller than the second ranging threshold, the first electronic device performs action C (step 727).

The determined action (either action A of step 723, action B of step 725, or action C of step 727) can include performing action or changing a state on the first electronic device and/or instructing the second electronic device to perform an action. After performing Action A of step 723, Action B of step 725, or Action C of step 727, the first electronic device can return to step 721 and perform an additional ranging with the second electronic device.

In certain embodiments, the actual action performed based on the ranging result can also depend on the current state of the first electronic device and/or the second electronic device. In certain embodiments, more or less ranging thresholds can be used for determining various actions to perform. Additionally, more or less actions can be performed. For example, the number of different actions that can be performed can be based on the number of ranging threshold Although FIGS. 7A and 7C illustrates example methods, various changes may be made to FIGS. 7A and 7C. For example, while the methods 700 and 720 are shown as a series of steps, various steps could overlap, occur in parallel, occur in a different order, or occur multiple times. In another example, steps may be omitted or replaced by other steps.

Figure 8A:
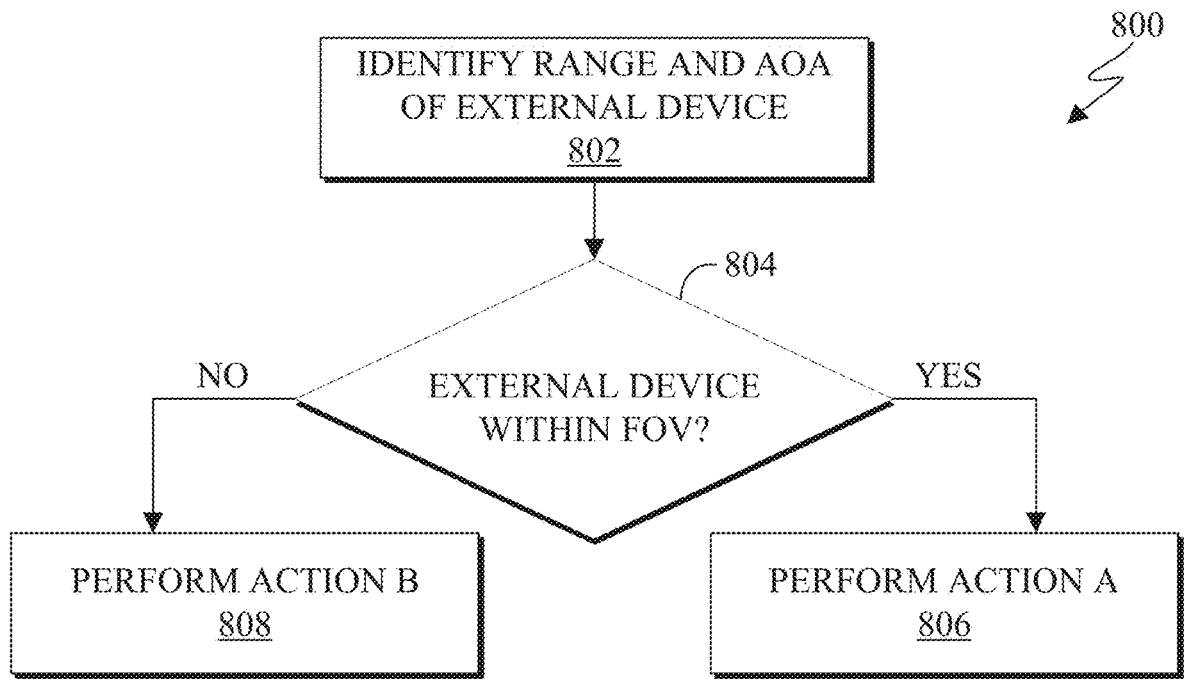
FIGS. 8A, 8B, and 8C illustrates an examples for proximity based device control based on field of view according to embodiments of the present disclosure.
Figure 8B:
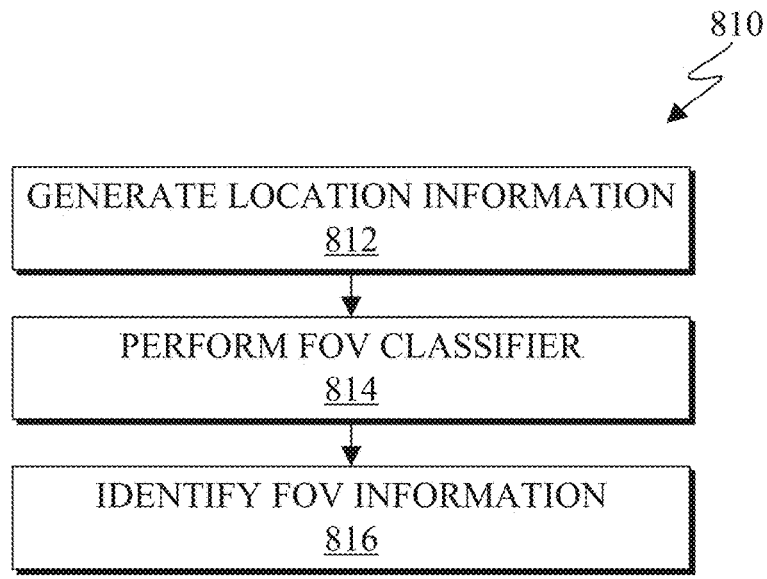
Figure 8C:
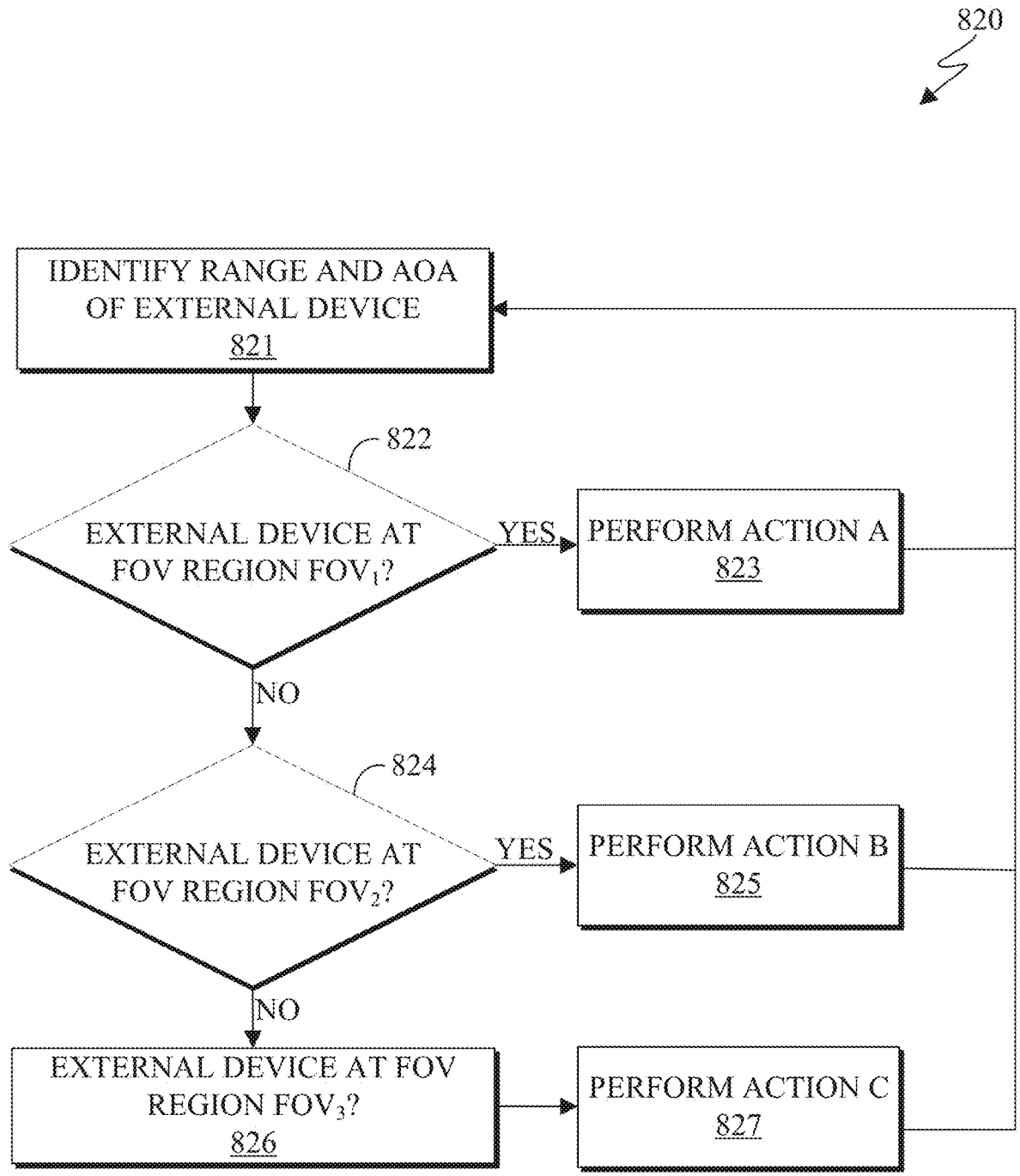

FIGS. 8A, 8B, and 8C illustrates an examples method for proximity based device control based on field of view according to embodiments of the present disclosure. In particular, FIG. 8A illustrates an example method 800 for device control based on field of view according to embodiments of the present disclosure. FIG. 8B illustrates an example method 810 for identifying field of view (FOV) information according to embodiments of the present disclosure. FIG. 8C illustrates an example method 820 for device control based on multiple field of view regions according to embodiments of the present disclosure.

The methods 800, 810 and 820 are described as implemented by any one of the client device 106-116 of FIG. 1 and can include internal components similar to that of electronic device 200 of FIG. 2 and the electronic device 301 of FIG. 3. However, the method 800 as shown in FIG. 8A, the method 810 as shown in FIG. 8B, and the method 820 as shown in FIG. 8C could be used with any other suitable electronic device and in any suitable system.

As illustrated in the method 800 of FIG. 8A and the method 820 of FIG. 8C, a first electronic device, (such as the television 116) determines an action to perform based on whether a second device (such as the mobile device 108 of FIG. 1) is within a FOV of the first electronic device.

The first electronic device generates location information based on obtained ranging and angle of arrival (AOA) measurement results with respect to the second electronic device (such as via the UWB signaling between the two electronic devices). The AOA can be two dimensional (either azimuth or elevation) or three dimensional (both azimuth and elevation). The range and the AOA can be used to determine whether the second electronic device is in the FOV of the first electronic device. FOV is a specific combination of a range of range values and a range of AOA values. For example, an FOV for a television can be defined as the region that has all the points having range values to the TV within 0-4 meters range, and AOA values measured from the TV within −50 to 50 degrees range (with AOA=0 degree corresponding to right in front of the TV). The result of in-FOV detection can be used to determine one or more actions on the first and/or the second electronic device. This is illustrated in FIGS. 8A and 8C. The actual action performed can depend on the current state of the first electronic device and/or the state of the second electronic device.

As illustrated in the method 800 of FIG. 8A, the first electronic device (such as the television 116 of FIG. 1) performs ranging with a second electronic device (such as the mobile device 108 of FIG. 1) (step 802). For example, the first electronic device and the second electronic device can include measuring transceivers, (such as the measuring transceiver 270 of FIG. 2) for performing the ranging, as described above in FIGS. 4A and 4B and AOA, as described above in FIG. 5A. In certain embodiments, the measuring transceivers are UWB transceivers. For example, the UWB transceiver on the first electronic device can generate location information representing a range and AOA with another UWB transceiver on the second electronic device. The location information can indicate the location of the second electronic device relative to the first electronic device.

In step 804, the first electronic device determines whether the second electronic device is within a field of view of the first electronic device. Based on the determination the first electronic device performs action A of step 806 or action B of step 808. For example, the first electronic device will perform action A (step 806) when the second electronic device is within the FOV of the first electronic device. Alternatively, the first electronic device performs action B (step 808) when the second electronic device is outside the FOV of the first electronic device. The determined action (either action A of step 806 or action B of step 808) can include performing action or changing a state on the first electronic device and/or instructing the second electronic device to perform an action.

In certain embodiments, range and AOA measurements may not sufficiently reliably or accurately determine the in-FOV condition. In these cases, a post-processing can be performed, which takes one or more the UWB signals as inputs, including range, AOA, and features related to the channel impulse response (CIR) of the UWB signals. The post processing is used to determine whether the second electronic device is in-FOV of the first electronic device or out-FOV of the first electronic device. Examples of the features related to the CIR include the signal strength or SNR of the first detected signal path, the signal strength or SNR of the strongest detected signal path and the like. The post-processing is illustrated in FIG. 8B and described below. Some examples of the post-processing are machine learning based algorithms such as neural network, support vector machine, and the like.

The method 810 of FIG. 8B can be performed by the first electronic device, such as the television 116 of FIG. 1, or transmitted to a server, such as the server 104 of FIG. 1 or a combination of different devices.

In step 812, the first electronic device generates location information. The location information can indicate the location of the second electronic device relative to the first electronic device. For example, the location information can include range (distance between the first electronic device and the second electronic device), AOA angle (in azimuth and/or elevation), and features related to the CIR of the signals.

In step 814, the first electronic device performs a FOV classifier. The FOV classifier uses the location information and features related to the CIR of the signals to determine the location of the second electronic device relative to one or more FOV regions. In step 816, the first electronic device identifies from the FOV information whether the second electronic device is within or outside a particular FOV region.

FIG. 8C is similar to FIG. 7C, described above. For example, the method 820 of FIG. 8C uses multiple FOV regions to determine an action to perform, while the method 720 of FIG. 7C describes using multiple ranging threshold to determine an action to perform. The method 820 of FIG. 8C can be extended to actions that are dependent on the 2D/3D location with the FOV of the second electronic device, or 2D/3D FOV region of the second electronic device. An FOV region is a range of distance values and a range of the angle values.

In step 821, a first electronic device ice (such as the television 116 of FIG. 1) generates location information associated with a second electronic device (such as the mobile devices 108 of FIG. 1). For example, the first electronic device can identify range and AOA features of the second electronic device. In certain embodiments, the first electronic device and the second electronic device include measuring transceivers, (such as the measuring transceiver 270 of FIG. 2) for identifying the ranging and AOA features, as described above in FIGS. 4A, 4B, and 5A. In certain embodiments, the measuring transceivers are UWB transceivers. The first electronic device can generate location information of the second electronic device. The location information can include range, an elevation angle, an azimuth angle, or any combination thereof.

In step 822, the first electronic device determines whether the second electronic device is within a first FOV region with respect to the first electronic device. When the second electronic device is within the first FOV region with respect to the first electronic device, the first electronic device performs action A (step 823). Alternatively, when the second electronic device is outside the first FOV region with respect to the first electronic device, the first electronic device proceeds to step 824.

In step 824 the first electronic device determines whether the location information indicates that the second electronic device is within a second FOV region with respect to the first electronic device. When the second electronic device is within the second FOV region with respect to the first electronic device, the first electronic device performs action B (step 825). Alternatively, when the second electronic device is outside the second FOV region with respect to the first electronic device, the first electronic device proceeds to step 826.

In step 826 the first electronic device determines whether the location information indicates that the second electronic device is within a third FOV region with respect to the first electronic device. When the second electronic device is within the third FOV region with respect to the first electronic device, the first electronic device performs action C (step 827).

The determined action (either action A of step 823, action B of step 825, or action C of step 827) can include performing action or changing a state on the first electronic device and/or instructing the second electronic device to perform an action. After performing Action A of step 823, Action B of step 825, or Action C of step 827, the first electronic device can return to step 821 and identify additional range or AOA features associated with one or more second electronic devices.

In certain embodiments, the actual action performed based on the ranging result can also depend on the current state of the first electronic device and/or the second electronic device. In certain embodiments, more or less FOV regions can be used for determining various actions to perform. Additionally, more or less actions can be performed. For example, the number of different actions that can be performed can be based on the number of FOV regions.

Although FIGS. 8A, 8B, and 8C illustrates example methods, various changes may be made to FIGS. 8A, 8B, and 8C. For example, while the methods 800, 810, and 820 are shown as a series of steps, various steps could overlap, occur in parallel, occur in a different order, or occur multiple times. In another example, steps may be omitted or replaced by other steps.

Regarding FIGS. 7A, 7C, 8A and 8C, the various actions to be performed can vary based on the location of one or more second electronic devices, and a state of any of the electronic devices.

In certain embodiments, the first electronic device can be a television (such as the Television 116 of FIG. 1), and the second electronic device can be a smart phone (such as the mobile device 108 of FIG. 1) or a smart watch. The television can be in an idle mode (power saving) state (Action A) where the screen can be turned off. When the second electronic device is within a range R of the television (based on FIG. 7A or 7B) or within a FOV region of the television (based on FIG. 8A or 8B), the television can change from Action A to Action B, where Action B is an active state. In the active state (Action B), the television can turn on and display a picture, a welcome message, or information that can be customized by the user.

Furthermore, the second electronic device can also perform action based on the range or the FOV region detection result. For example, the second electronic device can activate an application associated with the television such as a TV remote control application, when the second electronic device is within a range R of the television (or within a FOV region of the television). For example, the first electronic device can be further controlled (changing volume, changing a channel, playing a content, and the like) by identifying a gesture performed by the second electronic device.

In certain embodiments, additional features can be included with the first electronic device and/or the second electronic device to avoid unintentional triggers that cause an electronic device to perform a particular action (such as when the user inadvertently brings his phone (the second electronic device) within a distance of the TV (the first electronic device) for turning on the TV, but the user does not want the TV to turn on, at that particular time). For example, the user can set the action that is triggered based on a proximity (or range) to be disabled during certain hours of the day (e.g. work hours or late night). For another example, when the user does not deliberately disable the action, the second electronic device, when accidently triggered, can shows the option of disabling the feature to the user to decide. For another example, a configuration on the second electronic device could enable/disable range or FOV region detection when the second electronic device is locked or its screen is off, to avoid unintentional triggering of actions. Other techniques can be used to ensure the feature of action triggering based on proximity does not reduce user experience with devices.

Additional features can be added on the first electronic device to avoid unintentional triggers of actions. For example, the user can enable the auto login of his streaming account (such as NETFLIX) only during certain hours of the day (such as during a period of time for relaxing in the evening). In another example, when the user does not deliberately set the time duration for the automatic login to services, the user interface on the TV can directly shows the option of disabling the feature to the user to decide. Another user configuration could be enabling/disabling range or FOV region detection when the second electronic device is locked or its screen is off, to avoid unintentional service login. Other techniques can be used to ensure the feature of action triggering based on proximity does not reduce user experience with devices.

In certain embodiments, the first electronic device can be a television (such as the television 116 of FIG. 1), and the second electronic device can be a smart phone (such as the mobile device 108 of FIG. 1) or a smart watch. If the second electronic device has not been moved for a preset period of time (such as 5 minutes), regardless of whether the second electronic device is in FOV or not, the second electronic device can be put in a power saving mode with the range and AOA detection feature turned off.

In certain embodiments, the first electronic device can be a television (such as the television 116 of FIG. 1), and the second device can be a smart phone (such as the mobile device 108 of FIG. 1) or a smart watch. If the second electronic device has not been moved for a preset period of time (such as 5 minutes), regardless of whether the second electronic device is in FOV or not, the first electronic device can notify the second electronic device to enter a power saving mode and ignore when range and AOA detection from the first device. When the second electronic device start moving again, the first electronic device will set the first electronic device back to normal.

In certain embodiments, the first electronic device can be a television (such as the television 116 of FIG. 1), and the second electronic device can be a smart phone (such as the mobile device 108 of FIG. 1) or a smart watch. If the second electronic device has not been moved for a preset period of time (for instance, can be but not limited to be 30 minutes, or finished a section of the show), regardless of whether the second electronic device is in FOV or not, the first electronic device can send a reminder such as "Turn off the device?" The first electronic device can be put into the power saving mode if there is no respond for within another preset period of time (for instance, can be but not limited to be 2 minutes).

In certain embodiments, the first electronic device can be a television (such as the television 116 of FIG. 1), and the second electronic device can be a smart phone (such as the mobile device 108 of FIG. 1) or a smart watch. If the second electronic device start the active state, the second electronic device can be set as device's user interface screen pop-up with the user interface of control tools, or keep the original device's user interface and let the control algorithm running in the back.

In certain embodiments, the first electronic device can be a television (such as the television 116 of FIG. 1), and the second electronic device can be a smart phone (such as the mobile device 108 of FIG. 1) or a smart watch. In this embodiment, Action B is auto login of a service or account (such as a streaming service) run by the first electronic device, and Action A can be log off of the service or account. The service or account can be associated with the owner of the second electronic device that is in in proximity to the first electronic device, such that different service or account can be selected for the auto login depending on the device identity. The account authentication process takes into account the ranging result between the first electronic device and the second electronic device (such that authentication can pass when the ranging result which is securely sent to the authentication server determines if the device is within a required range for authentication).

For example, when the second electronic device is within a range R of the first electronic device (or within a FOV region of the first electronic device), the first electronic device can perform an auto login (Action B) of a service (such as a streaming service) or another account. Otherwise when the second electronic device is not within a range R of the first electronic device (or not within a FOV region of the first electronic device), the first electronic device can log out of the service or account (Action A). The service or account can be associated with the owner of the second electronic device. For example, the first electronic device can identify the first electronic device and be preprogramed to know that the second electronic device is associated with a particular user. Therefore, when the second electronic device associated with a particular user is within a certain range of the first electronic device, the first electronic device determines to use the log in information associated with the particular user of the second electronic device to use when logging into the account or service. For another example, the first electronic device can send a request to the second device for log in credentials associated with the user of the second device. The second device can then send the credentials automatically or request that the user provide the credentials which are then transmitted by the second device to the first electronic device.

In certain embodiments, the first electronic device can be a television (such as the television 116 of FIG. 1), and the second electronic device can be a smart phone (such as the mobile device 108 of FIG. 1) or a smart watch. In this embodiment, Action B can be auto play of a content such as video/movie on the first electronic device when the device is determined to be within a range or within a FOV region, Action A can be auto pause of the content playing when the second electronic device is determined to be out of range. For example, when the second device is within a range of FOV of the first device, the first device can initiate Action B for playing content (such as a movie, music or show). Alternatively, when the second device is not within a range of FOV of the first device, the first device can initiate Action A and pause the content from being played.

In certain embodiments, the first electronic device can be a television (such as the television 116 of FIG. 1), and the second electronic device can be a smart phone (such as the mobile device 108 of FIG. 1) or a smart watch. In this embodiment, action A can cause content to play on the second electronic device when the second electronic device is out of a range (or out of a FOV region) of the first electronic device. Action B can cause the content playing on the second electronic device to switch to the first electronic device when the second electronic device is within a range (or within a FOV region) of the first electronic device. Before the auto switching of the content from the second electronic device to the television and vice versa, a message can be shown on the second electronic device, the first electronic device, or both the first and second electronic devices, to confirm the switching action. The auto switching behavior can be conditioned additionally on a pre-configuration by the user, so that the user's intention for the auto switching behavior is understood beforehand by the devices.

In certain embodiments, Action A can be content playing on the second electronic device when the second electronic device is out of a range and Action B can be auto switch of the content playing from the second electronic device to the television when the second electronic device is within a range.

It is evident from the above embodiments that determination of Action A and Action B may also depend on the state of the first electronic device, the second electronic device, or both the first and second electronic devices, in addition to the location of the second electronic device with respect to the first electronic device. The states of the second electronic device and/or the first electronic device include (i) whether a video is being played on the second electronic device or the first electronic device, (ii) whether the first electronic device is power saving or idle mode, (iii) which service is active on the second electronic device or the first electronic device, and (iv) the like.

Figures 9A, 9B:
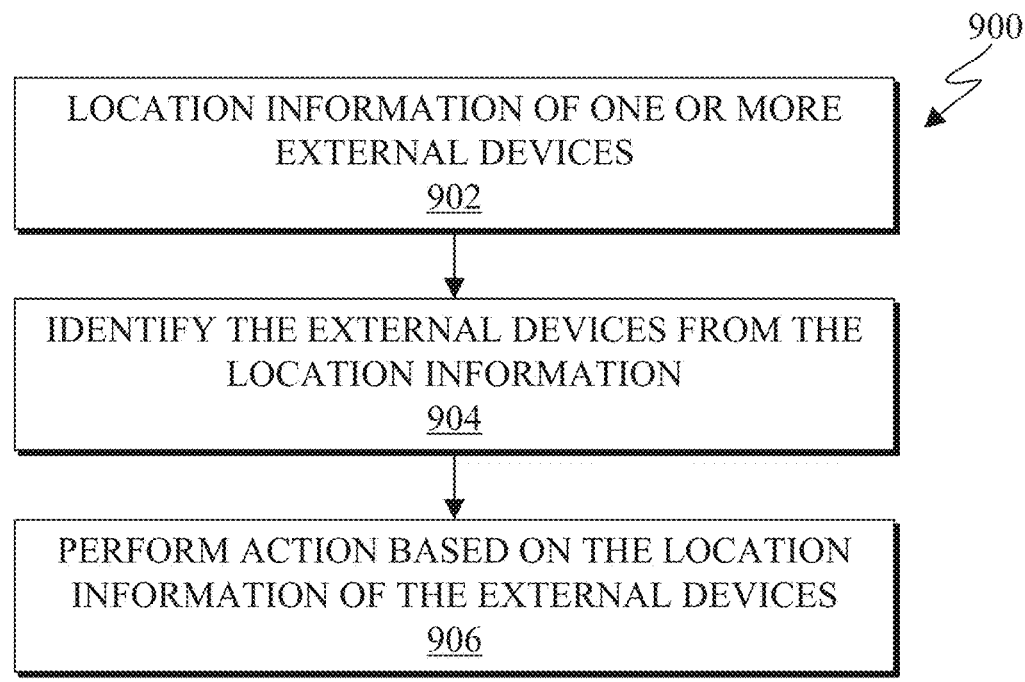
FIGS. 9A, 9B, 9C, and 9D illustrates an examples for proximity based device control for multiple devices according to embodiments of the present disclosure.
Figure 9C:
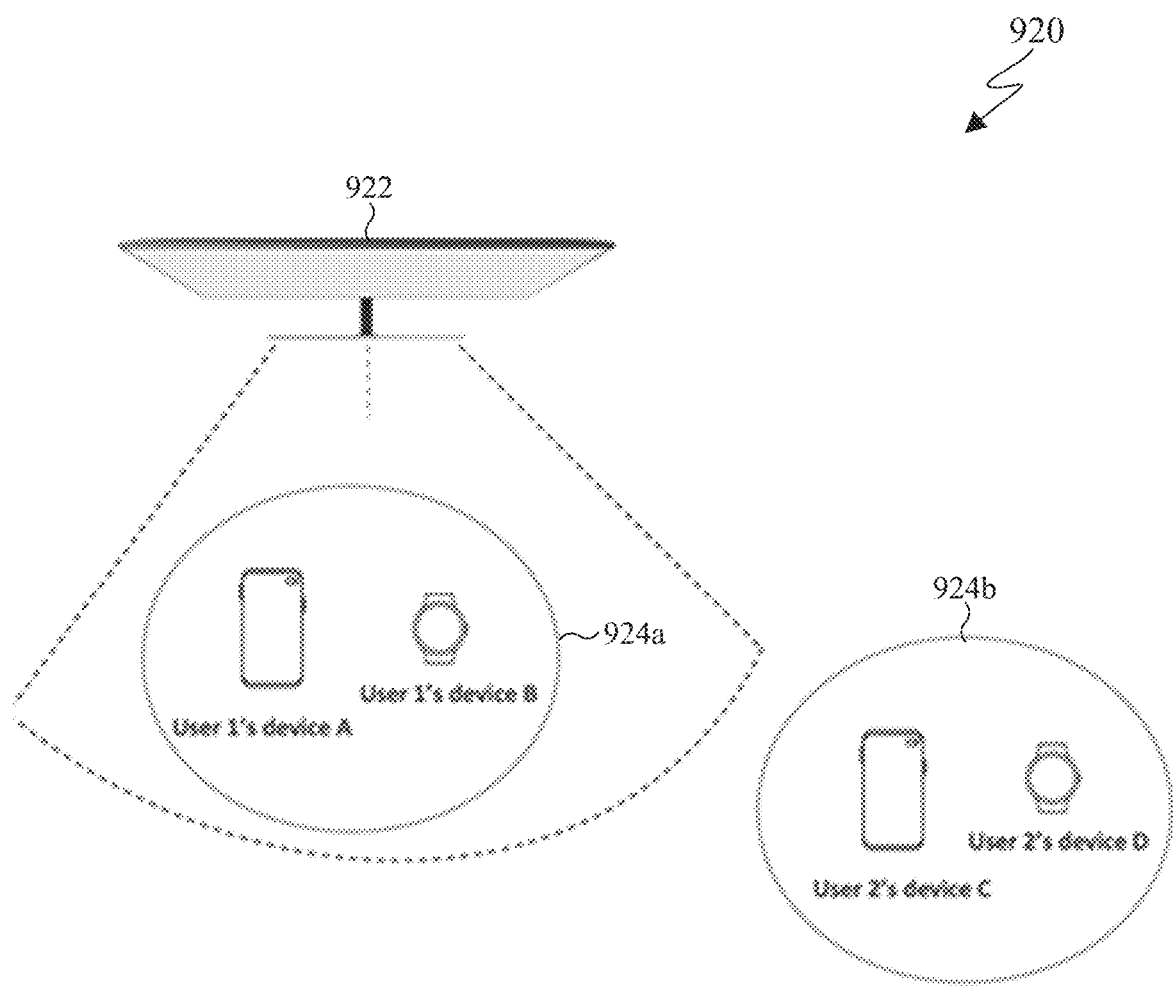
Figure 9D:
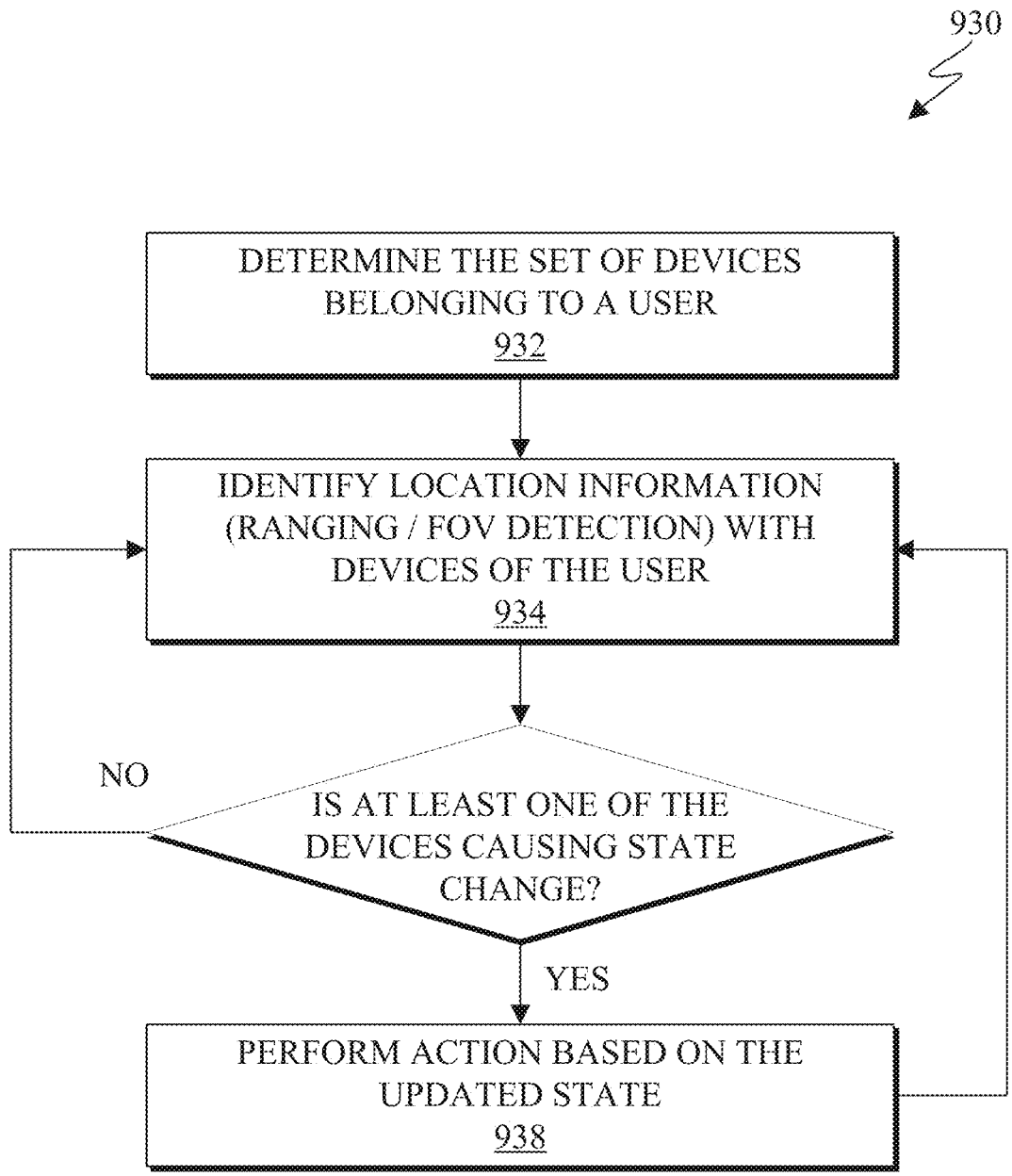

FIGS. 9A, 9B, 9C, and 9D illustrates an examples for proximity based device control for multiple devices according to embodiments of the present disclosure. In particular, FIG. 9A illustrates an example method 900 for performing an action based on location information of multiple external electronic devices according to embodiments of the present disclosure. FIG. 9B illustrates a table 910 indicating an action to perform based on the proximity of the multiple external electronic devices according to embodiments of the present disclosure. FIG. 9C illustrates a diagram 920 where describing. FIG. 9D illustrates an example method 930 for performing an action based on location information of multiple external electronic devices according to embodiments of the present disclosure.

The methods 900 and 930 of FIGS. 9A and 9D, are described as implemented by any one of the client device 106-116 of FIG. 1 and can include internal components similar to that of electronic device 200 of FIG. 2 and the electronic device 301 of FIG. 3. However, the methods 900 as shown in FIG. 9A and the method 930 as shown in FIG. 9D could be used with any other suitable electronic device and in any suitable system.

In certain embodiments, one device equipped with UWB module can perform ranging with multiple devices equipped with UWB modules, by performing one/two-way ranging to each device. For example, a first electronic device equipped with UWB module can perform ranging with multiple external electronic devices equipped with UWB modules. In other embodiments, the devices can be identified by the devices' MAC addresses or other uniquely identifiable ID within the network. That is, the proximity based device control processes as described between a first electronic device and a multiple external electronic devices can be extended to between a television and multiple devices.

As illustrated in the method 900 of FIG. 9A, a first electronic device, (such as the television 116 of FIG. 1) in step 902, generates location information of one or more external electronic devices (such as the mobile device 108 of FIG. 1) relative to the first electronic device based on a differences between the transmitted signals and the received signals. For example, the first electronic device generates location information of the one or more external electronic devices, such as two different mobile phones (such as the mobile devices 108 of FIG. 1).

For example, the location information can include ranging information, FOV, angles, or the like. The first electronic device and the one or more external electronic devices can include measuring transceivers, (such as the measuring transceiver 270 of FIG. 2) for performing the ranging, as described above in FIGS. 4A and 4B. In certain embodiments, the measuring transceivers are UWB transceivers.

In step 904, the first electronic device identifies the one or more external electronic devices from the location information. For example, the first electronic device can receive a device ID included in the received signals from the one or more external electronic devices. The device ID's can be used to identify each of the one or more external electronic devices. For example, the first electronic device can identify a user associated with each of the external electronic devices based on each device's respective device ID. In certain embodiments, the device ID's and their corresponding user is previously stored on the first electronic device. In certain embodiments, the external electronic devices can indicate to the first electronic device whether they belong to the same user, based on whether the external electronic devices have been securely paired by the user before (or two each other), or if the devices have been used to log into a user's account.

In this process the first electronic device can utilize UWB range and possibly 2D or 3D AOA measurements of each device and the corresponding device identity, to perform tasks as a function of the position of the two or more devices with respect to the first electronic device and the identities of the devices.

After identifying the location of the one or more external electronic devices and their corresponding owners, the first electronic device, in step 906, either performs an action, notifies any of the external electronic devices to perform an action, or a combination thereof based on the location of the one or more external electronic devices relative to the first electronic device and the owners of each device.

For example, the table 910 of FIG. 9B, describes different actions that can be performed based on the location information of two electronic devices that are used by different users. As illustrated in the table 910, the first electronic device can be a television (such as the television 116 of FIG. 1), and the external electronic devices (such as device 1 and device 2) can be a smart phone (such as the mobile device 108 of FIG. 1). Although, the table 910 illustrates two devices (device 1 and device 2), the table 910 is not intended to be limiting as additional external devices and actions can be included in the table.

As illustrated in the table 910, according to the method 900, the first electronic device (such as the television 116 of FIG. 1) can identify whether device 1 (such as the mobile device 108 of FIG. 1) and/or device 2 (such as the mobile device 108 of FIG. 1) are within a range from the first electronic device ("viewing zone"). Based on whether device 1 and device 2 are within a range of the first electronic device, and knowing that device 1 and device 2 are associated with different users, the first electronic device can determine and perform an action based. The determined action can include causing the first electronic device to change its state. Additionally, based on the determined action, the first electronic device can instruct device 1 and/or device 2 to perform an action.

For example, when both devices (device 1 and device 2) are out of range (or out of a FOV region), the first electronic device (such as a television) can take Action A, which can be to turn off or to go into an idle state. When device 1 is within range (or within a FOV region) and device 2 is out of range (or out of a FOV region), the first electronic device can take Action B for device 1, and the action can be customized or specific to device 1, such as activating and displaying preferred service or content for the user of device 1 on the display screen of the first electronic device. Likewise, when device 2 is within range (or within a FOV region) and device 1 is out of range (or out of a FOV region), the first electronic device can take Action C for device 2, and the action can be customized or specific to device 2, such as activating and displaying preferred service or content for the user of device 1 on the display screen of the first electronic device. When both device 1 and device 2 are within range (or within a FOV region), the first electronic device can take Action D, such as activating and displaying commonly preferred service or content for the users of device 1 and device 2.

In certain embodiments, any of the Actions, A, B, C, or D could cause content to be played on the device 1 or device 2 instead of the first electronic device. For example, device 1 is within range (or within a FOV region) and device 2 is out of range (or out of a FOV region), the first electronic device is performing Action B (displaying preferred service or content for the user of device 1 on the display screen of the television) and then device 2 is within the range (or FOV) of the first electronic device, the first electronic device could cause the preferred service or content for the user of device 2 on the display screen of the device 2. Upon the first electronic device determining that the device 1 is out of range (or out of a FOV region), the content that is playing on display screen of the device 2 can be transferred to the first electronic device.

As described above in step 904 of FIG. 9A, the first electronic device identifies the external electronic devices from the location information. For example, if the first electronic device receives device IDs from the external electronic devices, the device IDs can indicate whether the external electronic devices belong to different users or the same users. In certain embodiments, the multiple external electronic devices that belong to the same user, such as when a user is carrying a smart phone as well as wearing a smart watch. Other device types include tablet, AR/VR glass, ear buds, other wearables, and the like.

As illustrated in the diagram 920 of FIG. 9C, user 1's devices (device A and B) are within the "viewing zone" and user 2's devices (device C and D) are out of the "viewing zone". However, in general, it is also possible that different devices belonging to the same user are at different ranges or FOV regions, since a user may not always carry/wear all devices belonging to the user at the same time.

As illustrated in the method 930 of FIG. 9D, a first electronic device, (such as the television 116 of FIG. 1) in step 932, determines the set of user devices belonging to a user. For example, the first electronic device identifies one or more the external electronic devices and then determines which of the identified devices belong to each user. For example, the first electronic device groups one or more of the identified devices to a particular user.

In step 934, the first electronic device performs ranging or FOV detection with all the devices discovered. Actions based on the raging or the FOV detection can be customized for the user. In step 936, the first electronic device determines whether at least one of the external electronic devices cause a change in the state of the first electronic device. For example, at least one of the external electronic devices cause a change in the state of the first electronic device when the device leaves the range or FOV. If none of the electronic devices cause a change in the state of the first electronic device, then the first electronic device repeats step 934. Alternatively, when at least one of the electronic devices cause a change in the state of the first electronic device, the first electronic device performs an action.

In certain embodiments, the first electronic device performs an action in step 938, based on which device causes the first electronic device to change its state. That is, the first electronic device infers the user's intention from the multiple devices belonging to the user, based on the priority associated with the external electronic devices. Certain external electronic devices can have higher priority if the device is considered to be a wearable device that is actively worn. For example, active wearables such as the AR glass, the smart watch, the ear buds, are more likely to be strongly correlated with the user's location, when they are worn on the body of the user. When any of the external electronic devices are detected to be on-body (such as via an on body detection mechanism on the wearable device), they can have high priority than a smart phone (such as the mobile device 108) or another external device that is detected to not be on the body of the user. In one example, if both the AR glass (are detected as being worn) and the smart phone of a user are detected by the first electronic device, then the ranging result or FOV detection result of the AR glass has the higher priority to determine the corresponding action, than that of the smart phone. For instance, if the AR glasses leave the FOV while indicating that they are worn and the smart phone remains in the FOV, the first electronic device performs an action based on the location of the AR glasses (since they have a higher priority). The reason is that it is possible that the user walked away from the TV wearing the AR glasses and left his phone behind. Similarly, if the AR glasses are not worn and remain in the FOV while the phone leaves the FOV, then the first electronic device performs an action according to the phone leaving since the phone would have the higher priority since the AR glasses were not indicated as being worn.

In another embodiment, a first electronic device such as a television can perform ranging or FOV detection with all the devices it discovered. There can be multiple devices of the same type in the detection range and have been discovered by the first electronic device. For example, when multiple smart watches are in the detection range of first electronic device, user can set a special gesture (such as a circle that is drawn in the air) to determine the smart watch corresponding to the special gesture has the higher priority. If these multiple devices belong to same login user, the user can manually set the order of the priority.

In certain embodiments, a first electronic device such as a television can perform ranging or FOV detection with all the electronic devices discovered. There can be different types of devices in the detection range and have been discovered by the first electronic device. For example, when a smart watch, a pair of ear buds, a smart phone are in the detection range of the first electronic device, a user can set a special gesture (such as a circle that is drawn in the air) to determine the device corresponding to the special gesture has the higher priority. If these multiple devices belong to same login user, user can manually set the order of the priority.

In another embodiment, a first electronic device such as a television can perform ranging or FOV detection with multiple external electronic devices. There can be different types of devices in the detection range and have been discovered by the first electronic device. For example, when a smart watch, a pair of ear buds, a smart phone is in the detection range of the first electronic device, if these multiple electronic devices belong to different users, a user can manually set the order of the priority according to the user associated with each electronic device. For instance, a children's priority can manually set as lower than a main user.

In certain embodiments, if a first electronic device is a television, the television can split its screen into several smaller screens depending on the number of external electronic devices discovered within the FOV. The maximum number of split screens allowed can be preset in the first electronic device. If the number of the discovered external electronic devices exceeds the max number of split screens allowed by the first electronic device, only the high-priority devices can be allowed to use the split screen of the first electronic device. The first electronic device can respond to the action of each of the external electronic devices by displaying its response on its corresponding split screen. When one or several external electronic devices leave the FOV of the first electronic device, the first electronic device can close the split screen for the other device out of the FOV.

Although FIGS. 9A and 9D illustrates example methods, various changes may be made to FIGS. 9A and 9B. For example, while the method 900 is shown as a series of steps, various steps could overlap, occur in parallel, occur in a different order, or occur multiple times. In another example, steps may be omitted or replaced by other steps. Similarly, while the method 930 is shown as a series of steps, various steps could overlap, occur in parallel, occur in a different order, or occur multiple times. In another example, steps may be omitted or replaced by other steps.

Figure 10A:
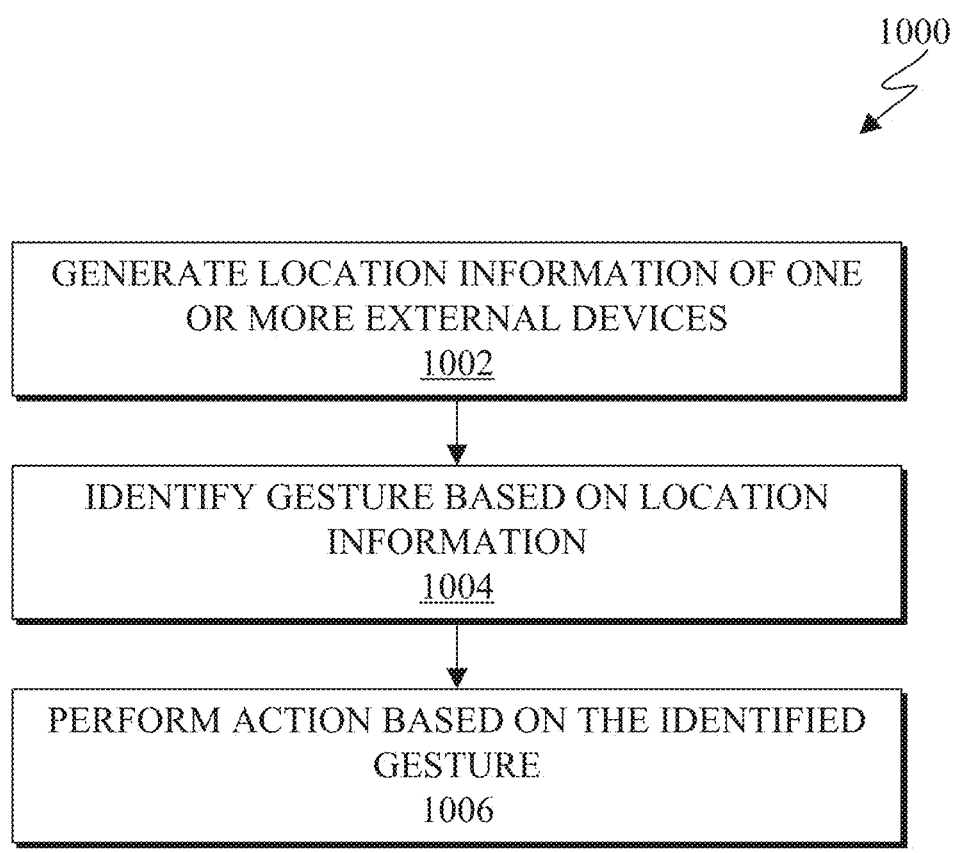
FIGS. 10A and 10B illustrate example methods for gesture based device control according to embodiments of the present disclosure.
Figure 10B:
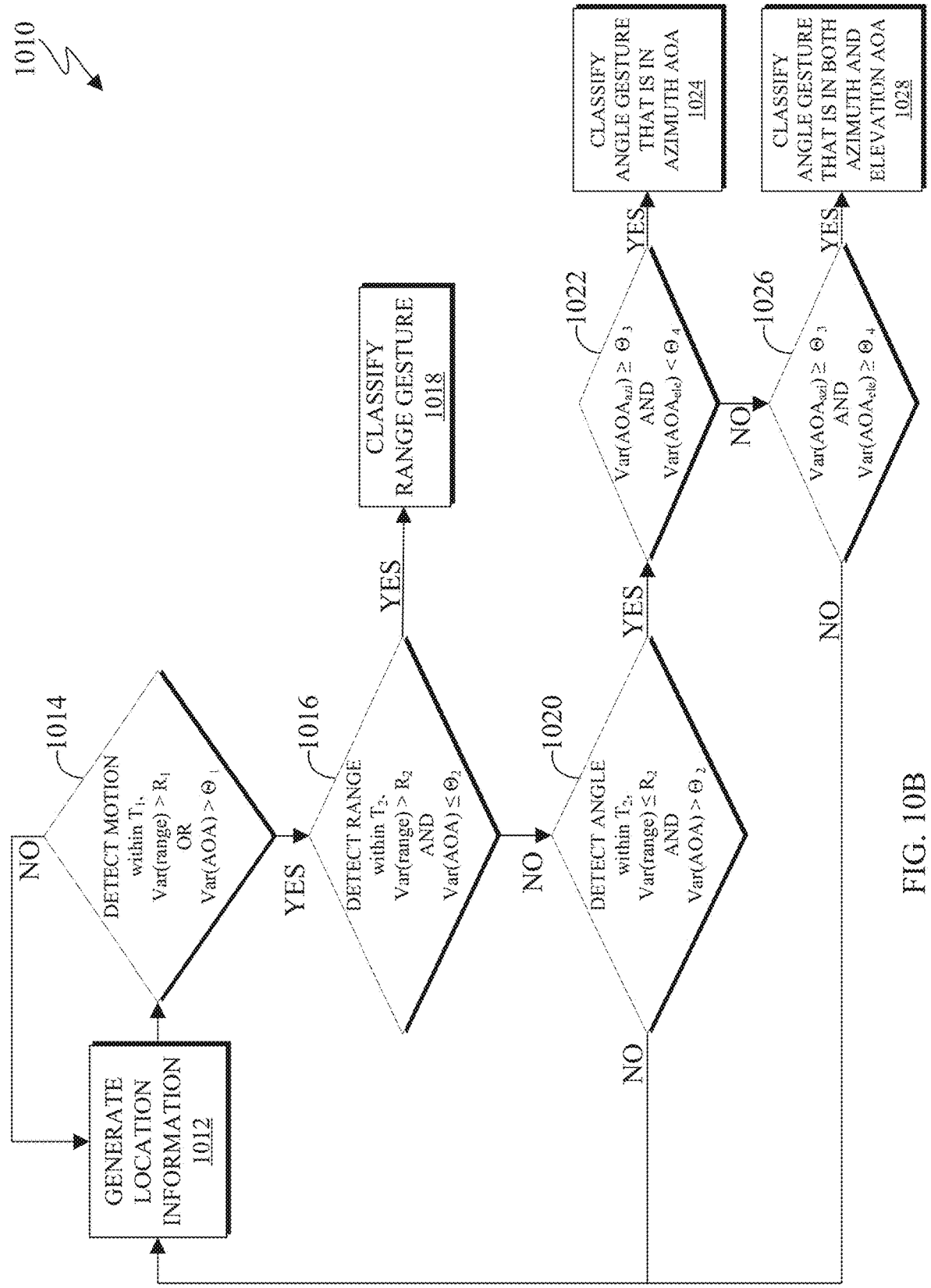

FIGS. 10A and 10B illustrate example methods 1000 and 1010 for gesture based device control according to embodiments of the present disclosure. The methods 1000 and 1010 are described as implemented by any one of the client device 106-116 of FIG. 1 and can include internal components similar to that of electronic device 200 of FIG. 2 and the electronic device 301 of FIG. 3. However, the method 1000 as shown in FIG. 10A and the method 1010 as shown in FIG. 10B could be used with any other suitable electronic device and in any suitable system.

Figure 11A:
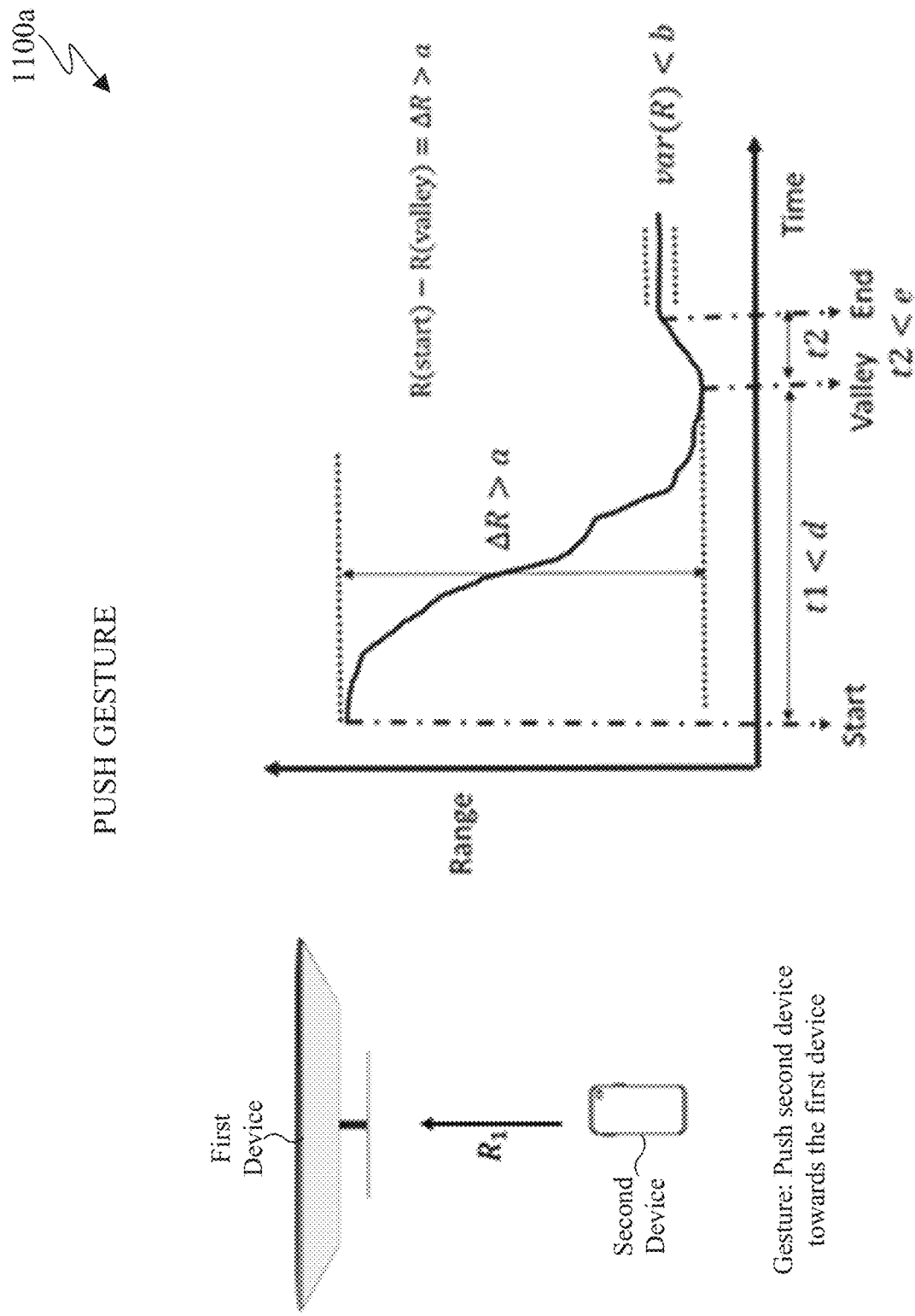
FIGS. 11A-11I illustrate example gestures according to embodiments of the present disclosure.
Figure 11B:
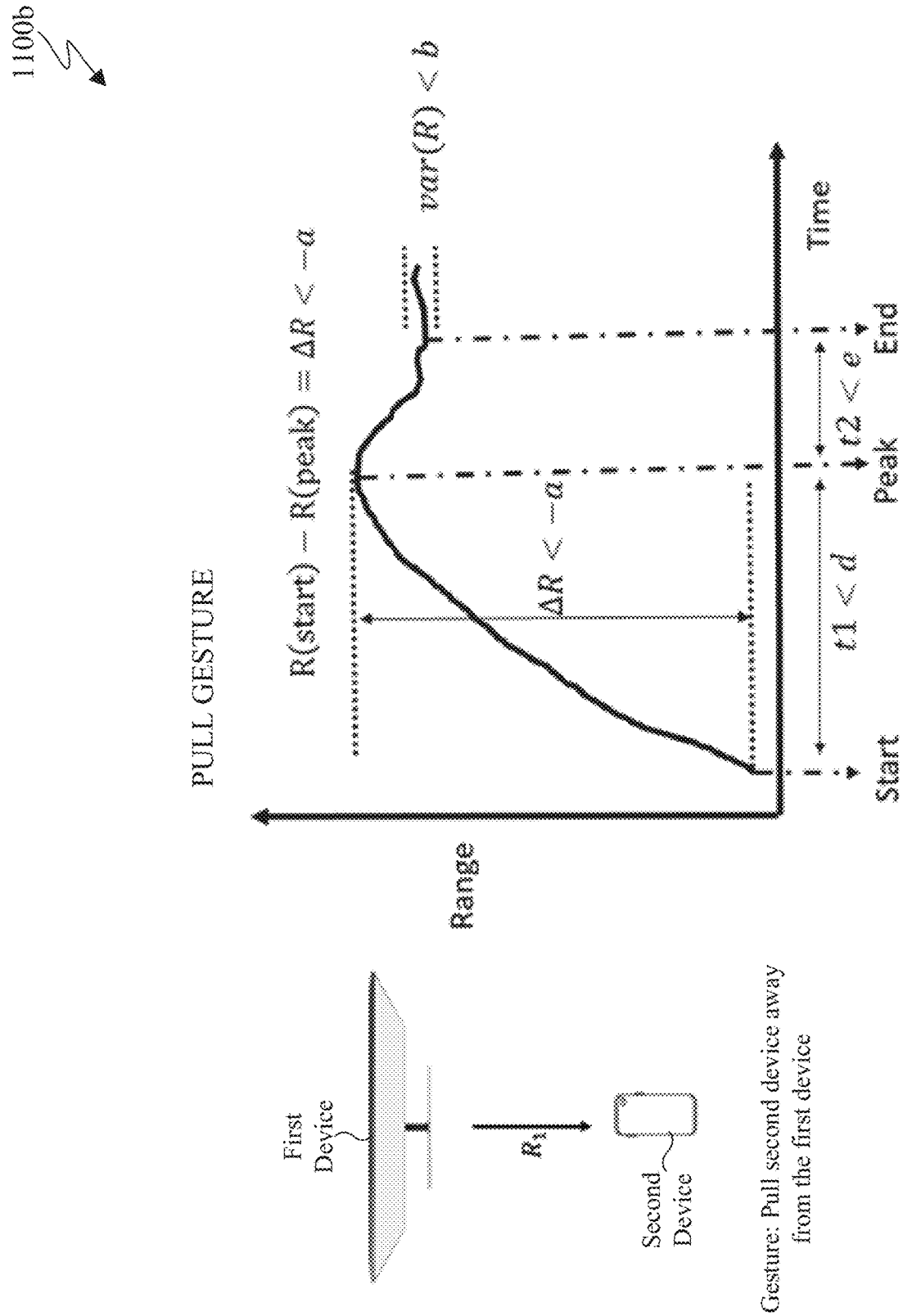
Figure 11C:
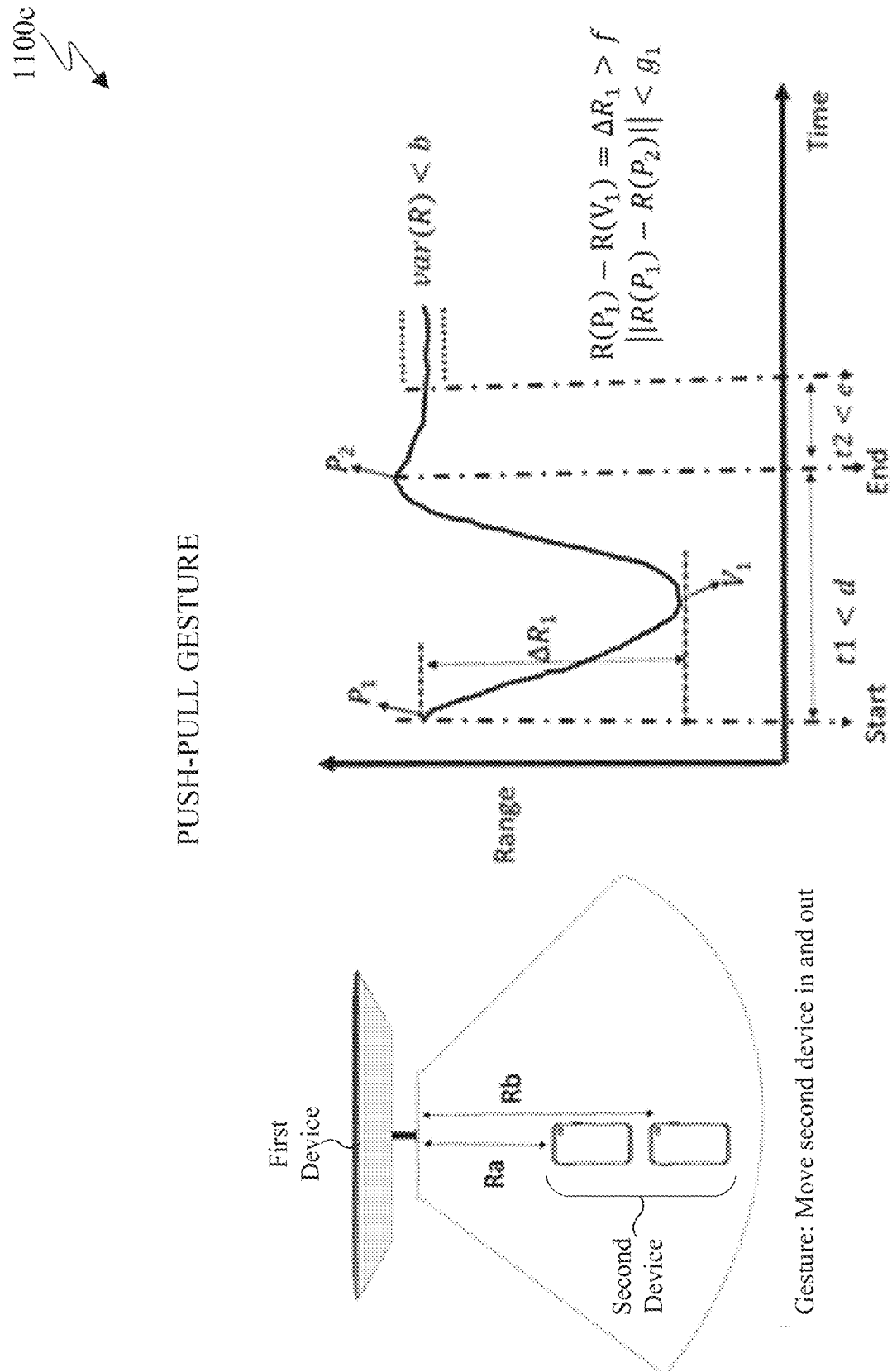
Figure 11D:
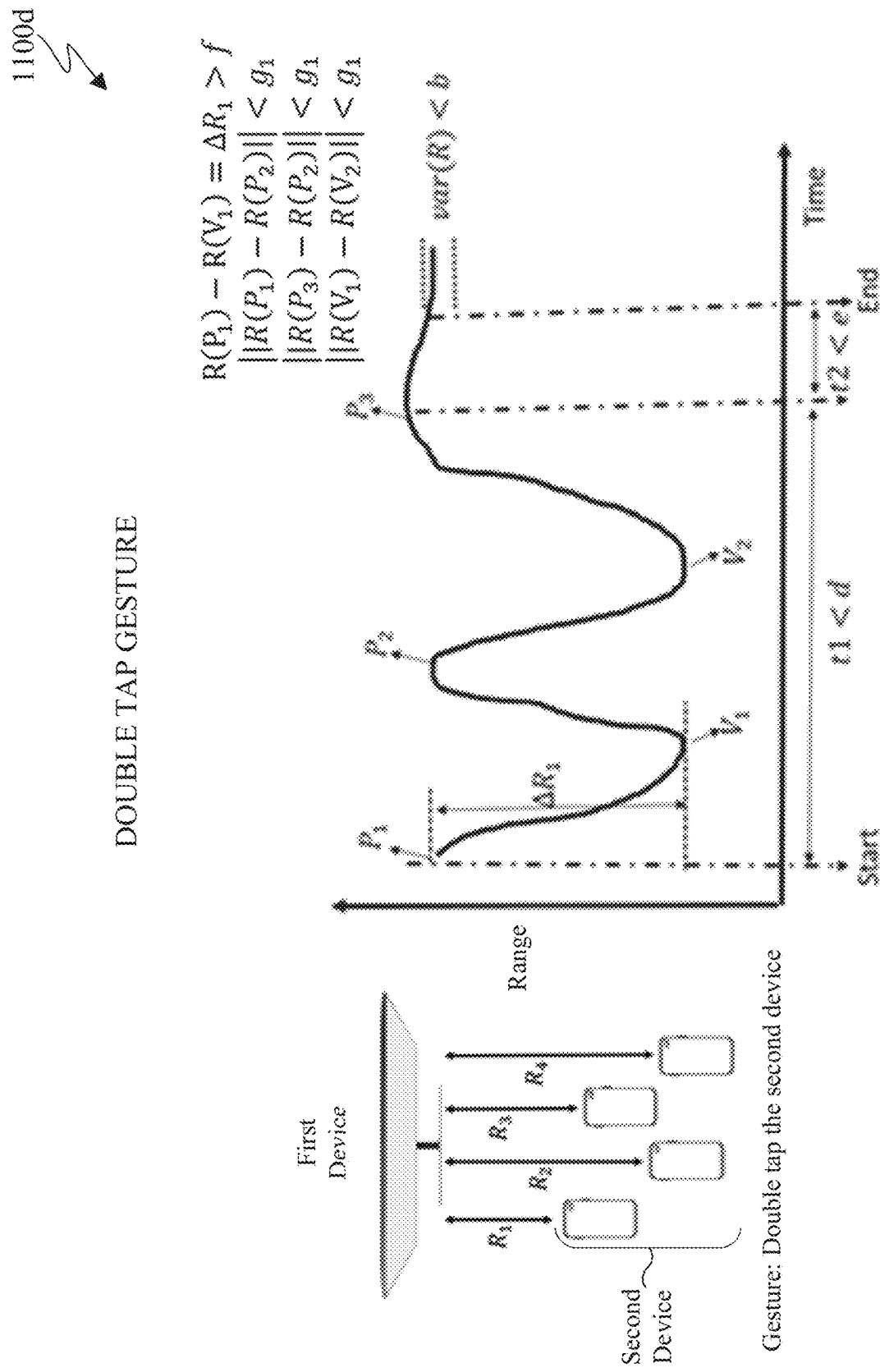
Figure 11E:
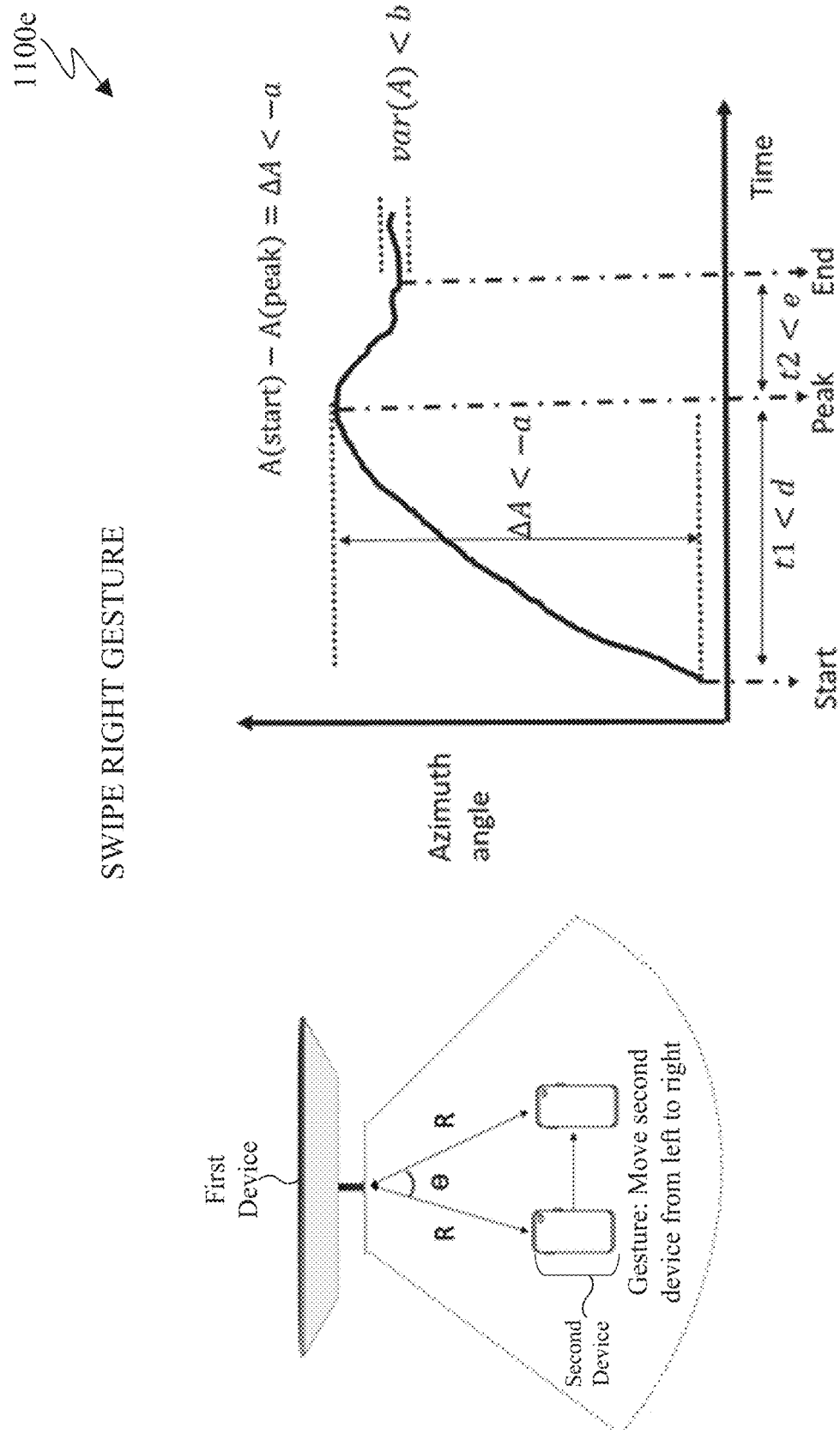
Figure 11F:
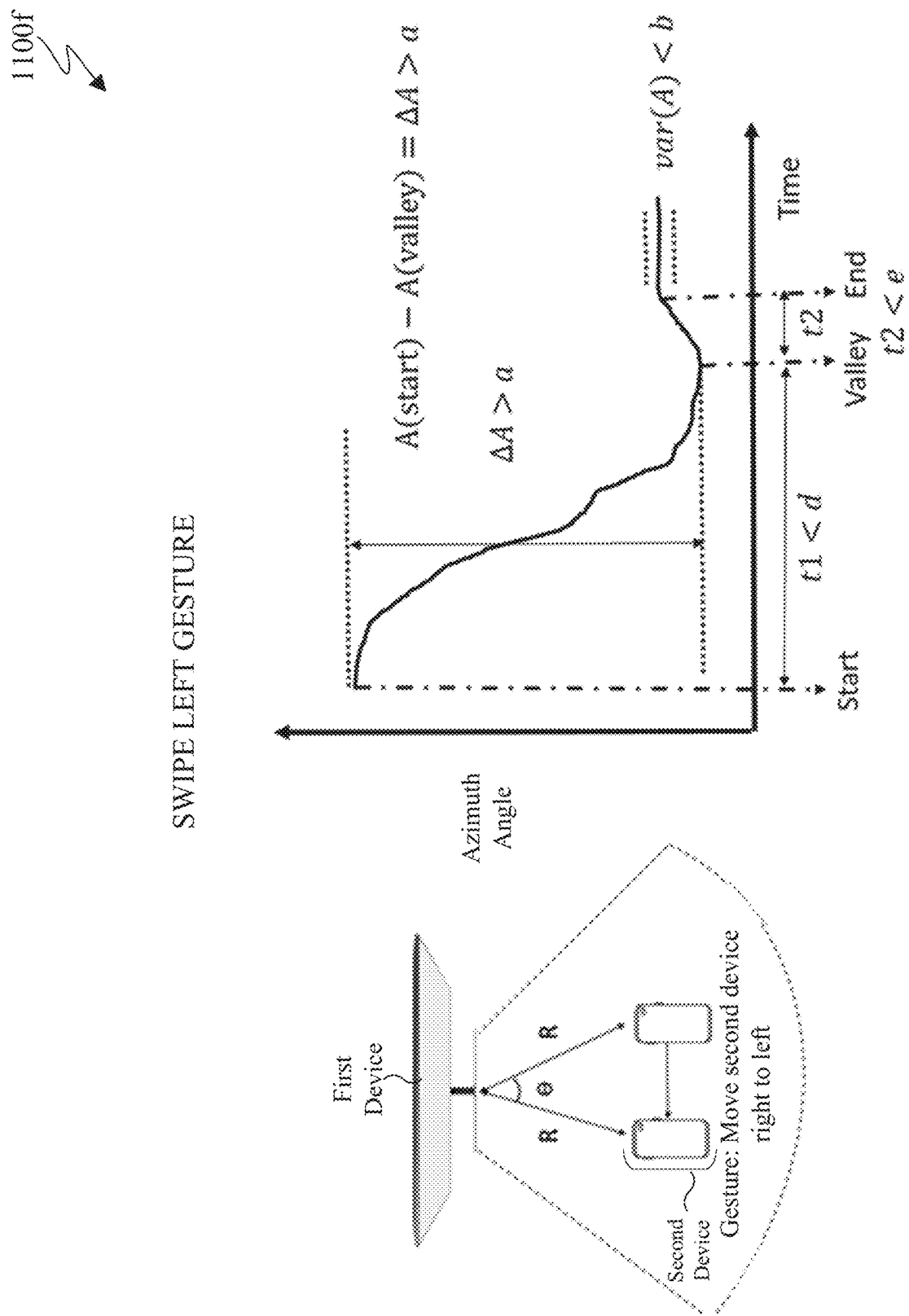
Figure 11G:
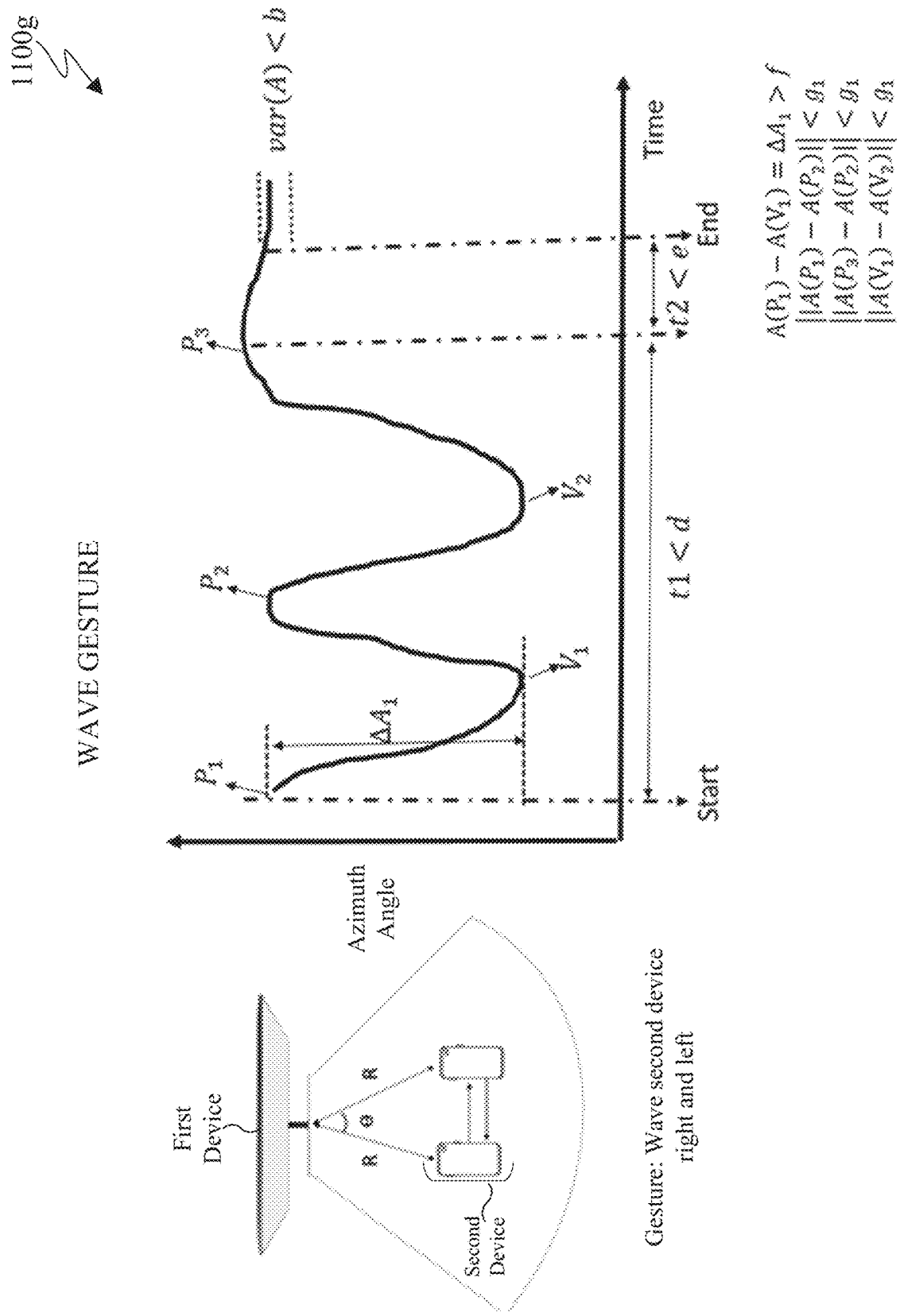
Figure 11H:
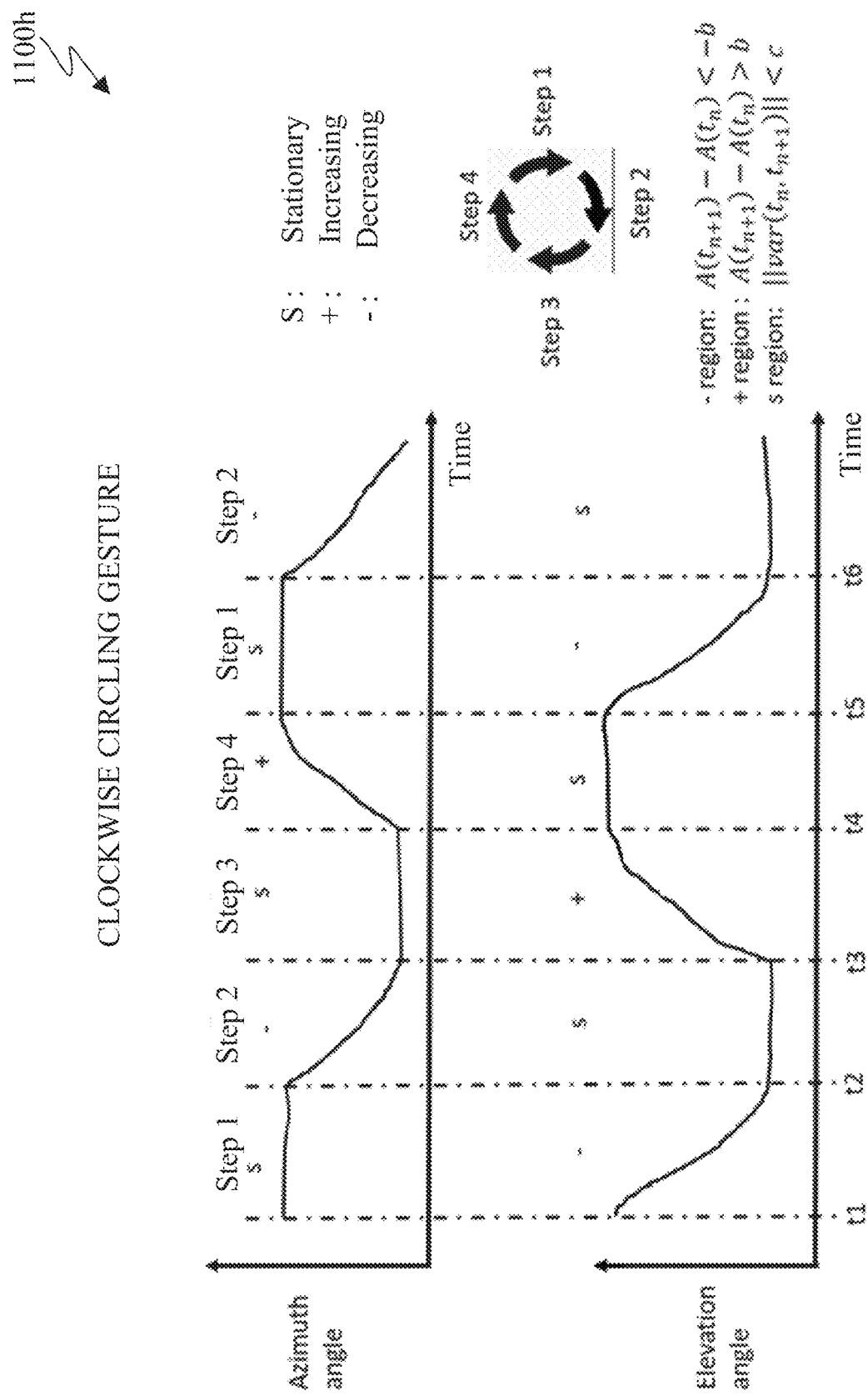
Figure 11I:
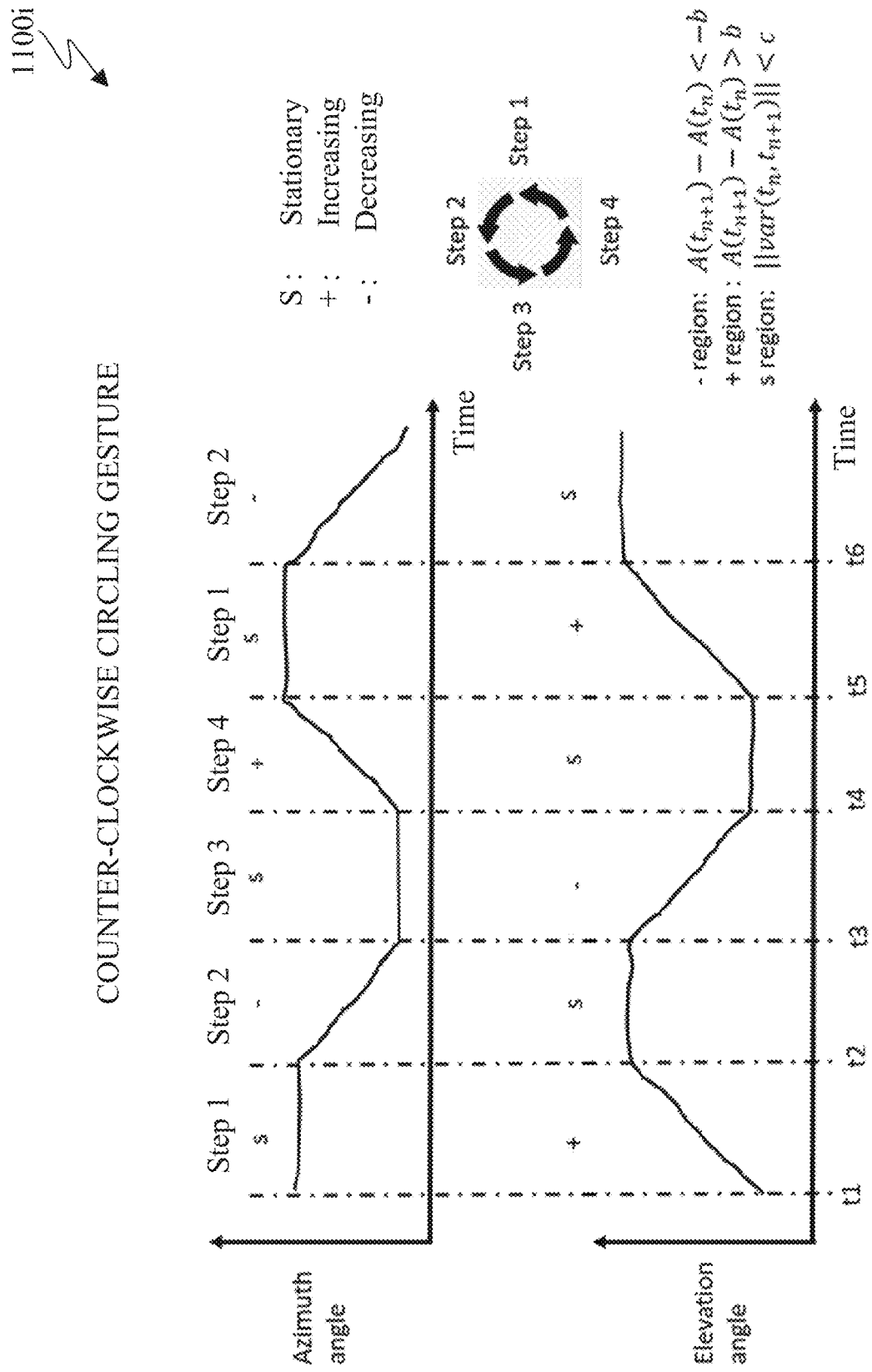

The gestures described in the methods 1000 and 1010 are described in greater detail in FIGS. 11A-11I. FIGS. 11A-11I illustrate example gestures according to embodiments of the present disclosure. In particular, FIG. 11A illustrates a push gesture 1100a. FIG. 11B illustrates a pull gesture 1100b. FIG. 11C illustrates a push-pull gesture 1100c. FIG. 11D illustrates a double tap gesture 1100d. FIG. 11E illustrates a swipe right gesture 1100e. FIG. 11f illustrates a swipe left gesture 1100f. FIG. 11G illustrates a wave gesture 1100g. FIG. 11H illustrates a clockwise circle gesture 1100h and FIG. 11I illustrates a counter-clockwise circle gesture 1100i.

In certain embodiments, when the first electronic device (such as a television) is equipped with an antenna array, the angle or direction of a second electronic device (external electronic device) such as a phone or a watch with respect to the first device can be detected and tracked by the first electronic device. In conjunction with the ranging result between the first electronic device and the second electronic device, a gesture that is performed by the second electronic device in front of the first electronic device can be determined by the first device. The identified gesture can be used to trigger an action on the first electronic device, the electronic second device, or both the first and second electronic devices. This process is illustrated in FIG. 10A.

For a gesture based device control feature, it is possible to provide configuration options to user to avoid triggering unintentional actions. For example, there can be an option to enable/disable the gesture based device control feature when the external electronic device (such as a smart phone) is locked or when the screen of the external electronic device is off.

As described FIGS. 7A through 9D, above, the first electronic device (such as a television) determines an action to perform, based on a particular location of an external electronic device. For example, based on whether an external electronic device is located within a particular range, or a particular FOV region (and possibly a state of one of the first electronic devices) with respect to the first electronic device (such as a television), the first electronic device performs a particular action. That is, the location information represents a single point in time. As described in FIGS. 10A through 11I, the location information represents a gesture that is based on location information that is generated over a period of time.

As illustrated in the method 1000 of FIG. 10A, a first electronic device generates location information of one or more electronic devices over a period of time (step 1002). For example, the first electronic device, (such as the television 116 of FIG. 1) generates location information of one or more external electronic devices (such as the mobile device 108 of FIG. 1) relative to the electronic device based on a differences between the transmitted signals and the received signals over a period of time. The location information can be range and AOA. The location information can be expressed in 2D (such as in FIG. 5E, described above) or in 3D (such as in FIG. 5F, described above).

For example, the first electronic device and the external electronic device can both include measuring transceivers, (such as the measuring transceiver 270 of FIG. 2) for performing the ranging, as described above in FIGS. 4A and 4B. In certain embodiments, the measuring transceivers are UWB transceivers. For example, the UWB transceiver on a first electronic device can perform ranging with another UWB transceiver on another device that is within the radio range. The result of ranging provides the distance (such as in in meter) between the two UWB transceivers. Additionally, the UWB transceivers can include antenna such as described in FIGS. 5B through 5D for calculating the AOA. In certain embodiments, the UWB transceivers can be located in one location or multiple locations on the first electronic device as described in FIGS. 6A through 6C, above.

In step 1004, the first electronic device receives the range measurements, angle measurements, or both range and angle measurements from the UWB transceiver. The first electronic device generates location information and performs gesture recognition. Based on the range, and AOA measurements over a period of time, the first electronic device identifies a gesture from the location information (range and/or angle).

For example, when the external electronic device is moved towards the first electronic device, the range between the two devices decreases. The first electronic device can identify the gesture as a push gesture as illustrated in FIG. 11A. When the external electronic device is moved away from the first electronic device, the range between the two devices increases. The first electronic device can identify the gesture as a pull gesture as illustrated in FIG. 11B.

When the external electronic device is moved away and then towards the first electronic device (or towards and then away from the first electronic device), the range between the two devices changes. The first electronic device can identify the gesture as a push-pull or pull push gesture as illustrated in FIG. 11C. Similarly, when external electronic device is repeatedly moved away and then towards the first electronic device (or repeatedly moved towards and then away from the first electronic device), the range between the two devices changes repeatedly. The first electronic device can identify the gesture as a double tap gesture as illustrated in FIG. 11D.

When the external electronic device is moved from a first location to the right, the angle between the two devices changes. The first electronic device can identify the gesture as a swipe right gesture as illustrated in FIG. 11E. Similarly, when the external electronic device is moved from a first location to the left, the angle between the two devices changes. The first electronic device can identify the gesture as a swipe left gesture as illustrated in FIG. 11F. When the external electronic device is moved from a first location and is waved to the left and right, the angle between the two devices changes repeatedly. The first electronic device can identify the gesture as a wave gesture as illustrated in FIG. 11G.

When the external electronic device is moved in in a circle, with the distance between the first electronic device and the external electronic device not changing (or changing below a threshold), the azimuth angle and the elevation angle changes. Based on a pattern of when the azimuth angle and the elevation angle change, the first electronic device can identify the gesture as a clockwise circling gesture as illustrated in FIG. 11H or as a counter-clockwise circling gesture as illustrated in FIG. 11I.

In step 1006 of FIG. 10A, the first electronic device performs an action according to the identified gesture. For example, the action could be changing the state of the first electronic device. For another example, the action could be notifying the external electronic device to perform an action. For yet another example, the action when performed causes the first electric device to change its state and notify the external electronic device to change its state, as well.

For example, the swipe right gesture of FIG. 11E and the swipe left gesture of FIG. 11F can be used to move a pointer displayed on the first electronic device (such as the television 116 of FIG. 1), or to change content selection displayed on the first electronic device by swiping left or right.

For another example, the push-pull gesture of FIG. 11C can be used to perform selection of a content or item displayed on the first electronic device (such as the television 116 of FIG. 1). For another example, a push-pull gesture can result in a content that is currently being displayed or played on the external electronic device (such as a mobile device 108 of FIG. 1) to be displayed or played on the first electronic device. In certain embodiments, when the same gesture is performed again (or another gesture is performed) switches the display from the first electronic device to the external electronic device.

To detect and differentiate various gestures performed by the second device (external electronic device), the first electronic device uses the observed time varying range and AOA features.

FIG. 10B illustrates the method 1010 for gesture detection and classification. In general, the method 1010 divides the gestures into two main categories. The first category corresponds to range gestures whose time-domain feature mainly varies in the detected range (such as illustrated in the gestures of FIGS. 11A-11D). The second category corresponds to angle gestures whose time-domain feature mainly varies in the detected AOA (such as illustrated in the gestures of FIGS. 11E-11I).

In step 1012, the first electronic device (such as the television 116 of FIG. 1) generates location information corresponding to the external electronic device (such as the mobile device 108 of FIG. 1). For example, the first electronic device generates location information of one or more external electronic devices (such as the mobile device 108 of FIG. 1) relative to the first electronic device based on a differences between the transmitted signals and the received signals over a period of time.

In step 1014, the first electronic device determines whether there is a significant enough motion present by checking that within a certain time $T_1$, whether the variation of the range and the variation of AOA are larger than threshold $R_1$ and $\theta_1$. When the variation of the range is smaller than the threshold $R_1$ and the variation of AOA is smaller than the threshold $\theta_1$, the first electronic device determines that there was no motion and returns to step 1012 to generate more location information. Alternatively, when either range or AOA variation is larger than the threshold, the first electronic device determines that a valid motion is detected, and proceeds to step 1016.

In step 1016, the first electronic device observes the signal for a time duration of $T_2$, where the start of the time duration $T_2$ can be the same of $T_1$ while the length of $T_2$ can be equal or larger than $T_1$. After a valid motion of the external electronic device is detected, the first electronic device determines whether the location information corresponding to the external electronic device includes a variation in the range is larger than a threshold $R_2$ and the variation of AOA that is smaller than the threshold $\theta_2$.

When the external electronic device includes a variation in the range that is larger than the threshold $R_2$ and a variation of AOA that is smaller than the threshold $\theta_2$, then the first electronic device determines that the gesture is a range gesture and classifies the gesture in step 1018. For example, based on how the range changes over a period of time, the first electronic device classifies the gesture as a push gesture as illustrated in FIG. 11A, a pull gesture as illustrated in FIG. 11B, a push-pull gesture as illustrated in FIG. 11C, a double tap gesture as illustrated in FIG. 11D, or another type of gesture.

When the first electronic device determines that the variation is in the range that is less than the threshold $R_2$ or a variation of AOA that is larger than the threshold $\theta_2$, then the first electronic device, in step 1020 further classifies the gesture. In step 1020, the first electronic device determines whether the variation in the range that is less than or equal to the threshold $R_2$ and a variation of AOA that is larger than the threshold $\theta_2$. If both of the variation do not satisfy the condition (variation of the range is less than or equal to the threshold $R_2$ and the variation of AOA that is larger than the threshold $\theta_2$), then the first electronic device determines that there was an invalid motion detected and returns to step 1012 to generate more location information.

After determining that there was a valid motion, the first electronic device, in step 1022 inspects the particular elevation and azimuth variations of the AOA. That is, in step 1022, the first electronic device determines whether the variation in the azimuth AOA are larger than or equal to the threshold $\theta_3$ and whether the variation of elevation AOA are smaller than the threshold $\theta_4$. If both conditions are satisfied, then the first electronic device classifies the gesture as an azimuth angle gesture. For example, based on how the azimuth AOA changes over a period of time, the first electronic device classifies the gesture as a swipe right gesture as illustrated in FIG. 11E, a swipe left gesture as illustrated in FIG. 11F, a wave gesture as illustrated in FIGURE G, or another type of gesture.

If both conditions (of step 1022) are not satisfied (such as when the variation of elevation AOA is larger than the threshold $\theta_4$) the first electronic device, in step 1026 determines whether the variation in the variation of azimuth AOA that is larger than or equal to the threshold $\theta_3$ and whether the variation of elevation AOA that is larger than or equal to the threshold $\theta_4$.

If both conditions (of step 1022) are not satisfied, then the first electronic device classifies the gesture was an invalid motion detected and returns to step 1012 to generate more location information.

Alternatively, if the first electronic device, in step 1026 determines that the variation of azimuth AOA that is larger than or equal to the threshold $\theta_3$ and the variation of elevation AOA that is larger than or equal to the threshold $\theta_4$, then in step 1028, the first electronic device classifies the gesture as a circle gesture. Additionally, based on how the elevation and azimuth change over a period of time, the first electronic device classifies the gesture as a clockwise circling gesture as illustrated in FIG. 11H, a counter-clockwise circling gesture as illustrated in FIG. 11I, or another type of gesture.

That is, the method 1010 describes that the first electronic device classifies the gestures to be range gestures and angle gestures based on whether the main time-domain feature variation is in the range or in the angle. Within the angle gestures, the first electronic device further divides the angle gestures based on whether the angle variation is mainly in azimuth direction or the variation is in both azimuth and elevation direction.

For example, the range gestures classification, as performed in step 1018 of the FIG. 10B, the first electronic device identifies the end of the gesture. For example, the first electronic device can use a condition to indicate when the variation of the range is smaller than a threshold for a period of time. For example, during a time t, the variation of the range Var(R)<b. After finding the end of the gestures, the electronic device then use several conditions to differentiate between a pull gesture, a push gesture, a push-pull gesture, and a double tap gesture. The condition for a pull gesture is described in Equation (6), below. The condition for a push gesture is described in Equation (7), below. The condition for a push-pull gesture is described in Equation (8), below. The condition for a double tap gesture is described in Equation (9), below.

$$\Delta R < -a \text{ AND } t1 < d \text{ AND } t2 < e \tag{6}$$

$$\Delta R > a \text{ AND } t1 < d \text{ AND } t2 < e \tag{7}$$

$$\Delta R_1 > f \text{ AND } t1 < d \text{ AND } t2 < e \text{ AND } \|R(P_1) - R(P_2)\| < g1 \tag{8}$$

$$\Delta R_1 > f \text{ AND } t1 < d \text{ AND } t2 < e \text{ AND } \|R(P_1) - R(P_2)\| < g1 \text{ AND } \|R(P_3) - R(P_2)\| < g1 \text{ AND } \|R(V_1) - R(V_2)\| < g1 \tag{9}$$

The angle gestures classification as performed in step 1020 and 1022 of the FIG. 10B, uses a transceiver with the antennas that are placed in the azimuth direction, the elevation direction, or both the azimuth and elevation directions, such as described in FIG. 5B, 5C, or 5D. The azimuth angle can be represented by the expression A when classifying the angle gestures with azimuth angle variation (swipe left, swipe right, wave), as described in step 1022. To identify the end of the gestures, the first electronic device uses a condition to indicate when the variation of the azimuth angle is smaller than a threshold for a period of time. For example, during a time t, the variation of the azimuth angle Var(A)<b. After finding the end of the gestures, the first electronic device then use several conditions to differentiate between a swipe left gesture, a swipe right gesture, or a wave gesture. The condition for a swipe left gesture is described in Equation (10), below. The condition for a swipe right gesture is described in Equation (11), below. The condition for a wave gesture is described in Equation (12), below.

$$\Delta A > a \text{ AND } t1 < d \text{ AND } t2 < e \tag{10}$$

$$\Delta A < -a \text{ AND } t1 < d \text{ AND } t2 < e \tag{11}$$

$$\Delta A_1 > f \text{ AND } t1 < d \text{ AND } t2 < e \text{ AND } \|A(P_1) - A(P_2)\| < g1 \text{ AND } \|A(P_3) - A(P_2)\| < g1 \text{ AND } \|A(V_1) - A(V_2)\| < g1 \tag{12}$$

If the first electronic device determines that the variation in both the azimuth angles and elevation angles is larger than certain thresholds, as shown in step 1026 of FIG. 10B, the electronic device then determines that the detected motion is a circling gesture. To classify the circling gesture as a clockwise circling gesture or a counter-clockwise circling gesture, the first electronic device inspects the time-series angle signal of both azimuth and elevation direction. For example, the electronic device segments the time-series elevation angle and the time-series azimuth angle into 3 types of regions. A region denoted by 'S' corresponds to a stable region. A region denoted by '+' corresponds to a positive region. A region denoted by '−' corresponds to a negative region. The regions are illustrated in FIGS. 11H and 11I.

An 'S' region is identified, during a period of time $t_{n+1} - t_n$, when the condition, as described in Equation (13) below, is satisfied. In Equation (13), var represents the variance. A region denoted by '+' is identified, during a period of time $t_{n+1}-t_n$, when the condition, as described in Equation (14) below, is satisfied. A region denoted '−' is identified, during a period of time $t_{n+1}-t_n$, when the condition, as described in Equation (15) below, is satisfied. In Equations (13), (14), and (15), c and b are a positive numbers. It is noted that to and $t_{n+1}$ are two observation time point. The time duration between these two observation time point is $t_{n+1}-t_n$.

$$\|\text{var}(t_n, t_{n+1})\| < c \quad (13)$$

$$A(t_{n+1})-A(t_n) > b \quad (14)$$

$$A(t_{n+1})-A(t_n) < -b \quad (15)$$

To differentiate between clockwise and counter-wise circling, the first electronic device identifies a pattern from the region variation sequence of the azimuth and elevation angles. For example, the clockwise circling gesture, the region variation sequence is shown in FIG. 11H, while the counter-clockwise circling gesture, the region variation sequence is shown in FIG. 11I.

For the clockwise circling gesture, the pattern can start with step 1 and continue with steps 2-4 and then back to step 1. It is noted, the start of the clockwise circling gesture can also be step 2, 3, or 4. If the clockwise circling gesture is performed with steps 1, 2, 3, 4, 1, 2, as illustrated in FIG. 11H, then the time-series angle variation region sequence pair (azimuth angle region, elevation angle region) for clockwise circling can represent the following (S, −), (−, S), (S, +), (+, S), (S, −), (−, S).

For the counter-clockwise circling gesture, it can start with step 1 and continue with step 2-4 and then back to step 1. It is noted, that the start of the counter-clockwise can also be step 2, 3, or 4. If the counter-clockwise circling gesture is performed with steps 1, 2, 3, 4, 1, 2, as illustrated in FIG. 11I, then the time-series region sequence pair (azimuth angle region, elevation angle region) for counter-clockwise circling can represent the following pattern (S, +), (−, S), (S, −), (+, S), (S, +), (−, S).

To differentiate clockwise and counter-clockwise circling, the electronic device uses the region sequence pairs of X number of steps, where X is equal or larger than two. For example, upon observing two consecutive region sequence pairs, such as (S, −) and (−, S), or (−, S) and (S, +), or (S, +) and (+, S), or (+, S) and (S, −), appear only in clockwise circling. Similarly, the two consecutive region sequence pairs (S, +) and (−, S), or (−, S) and (S, −), or (S, −) and (+, S), or (+, S) and (S, +) appear only in counter-clockwise circling.

The number of the circles the second electronic device draws can be determined by the number of region sequence pairs detected divide by four. For example, in the clockwise circling case, if six angle variation region pairs pattern (S, −), (−, S), (S, +), (+, S), (S, −), (−, S) are detected, then the total number of circles drawn is 6/4=1.5 circles.

In certain embodiments, the circling gesture can be used to increase or decrease the volume of the first electronic device depending on the circling directions. The number of circles that are drawn can be used to determine the numeric values that the volume is turned up or down.

In certain embodiments, the circling gesture can also be used to fast-forward or rewind the video playing on the first electronic device depending on the circling directions. The number of circles that are drawn can be used to determine the numeric value of the amount of the time that the video is fast-forwarding or rewinding.

In certain embodiments, one or more devices can be wearable devices that are worn by a user. For example, one device can be worn on a wrist of a user while another device is strapped to the ankle of the user. Using two wearable devices, enables the first electronic device to track the movements of the user and enable interactive gaming, as well as fitness training support.

In certain embodiments, volume control (such as increasing the volume or decreasing the volume) or content pause can be controlled when external electronic device is within viewing/hearing range as measured by first electronic device.

In certain embodiments, gesturing to first electronic device (such as a television 116 of FIG. 1) TV using the external electronic device (such as the mobile device 108 of FIG. 1) while a video call is on-going on the external electronic device causes the external electronic device to transfer the video call session to the first electronic device. For example, when the first electronic device identifies the gesture (as performed by the external electronic device), the first electronic device can identify the state of the first electronic device and the state of the external electronic device (the state here indicates the external electronic device is performing a video call). Thereafter, the first electronic device can generate a notification instructing the external electronic device to transfer the video call to the first electronic device.

In certain embodiments, when the external electronic device (such as the mobile device 108 of FIG. 1) is moved away from a viewing zone of the first electronic device (such as the television of FIG. 1), while video call is on-going on the first electronic device, the first electronic device can transfer the video call session from the first electronic device to the external electronic device.

In certain embodiments, because every house's size and layout is different, a user can set up the range regions and/or FOV regions according to the house layout. For example, a first electronic device (such as a television 116 of FIG. 1) can perform ranging or FOV detection with all the devices discovered. For example, the first electronic device is in a first room (such as a living room), but the user controls the first electronic device in another room (such as the kitchen). When the devices are in different rooms or areas of the house, the user can setup the range region and FOV region detection to be oriented toward the particular area or room (such as the kitchen).

Although FIGS. 10A and 10B illustrates example methods, various changes may be made to FIGS. 10A and 10B. For example, while the method 1000 is shown as a series of steps, various steps could overlap, occur in parallel, occur in a different order, or occur multiple times. In another example, steps may be omitted or replaced by other steps. Similarly, while the method 1010 is shown as a series of steps, various steps could overlap, occur in parallel, occur in a different order, or occur multiple times. In another example, steps may be omitted or replaced by other steps.

Figure 12:
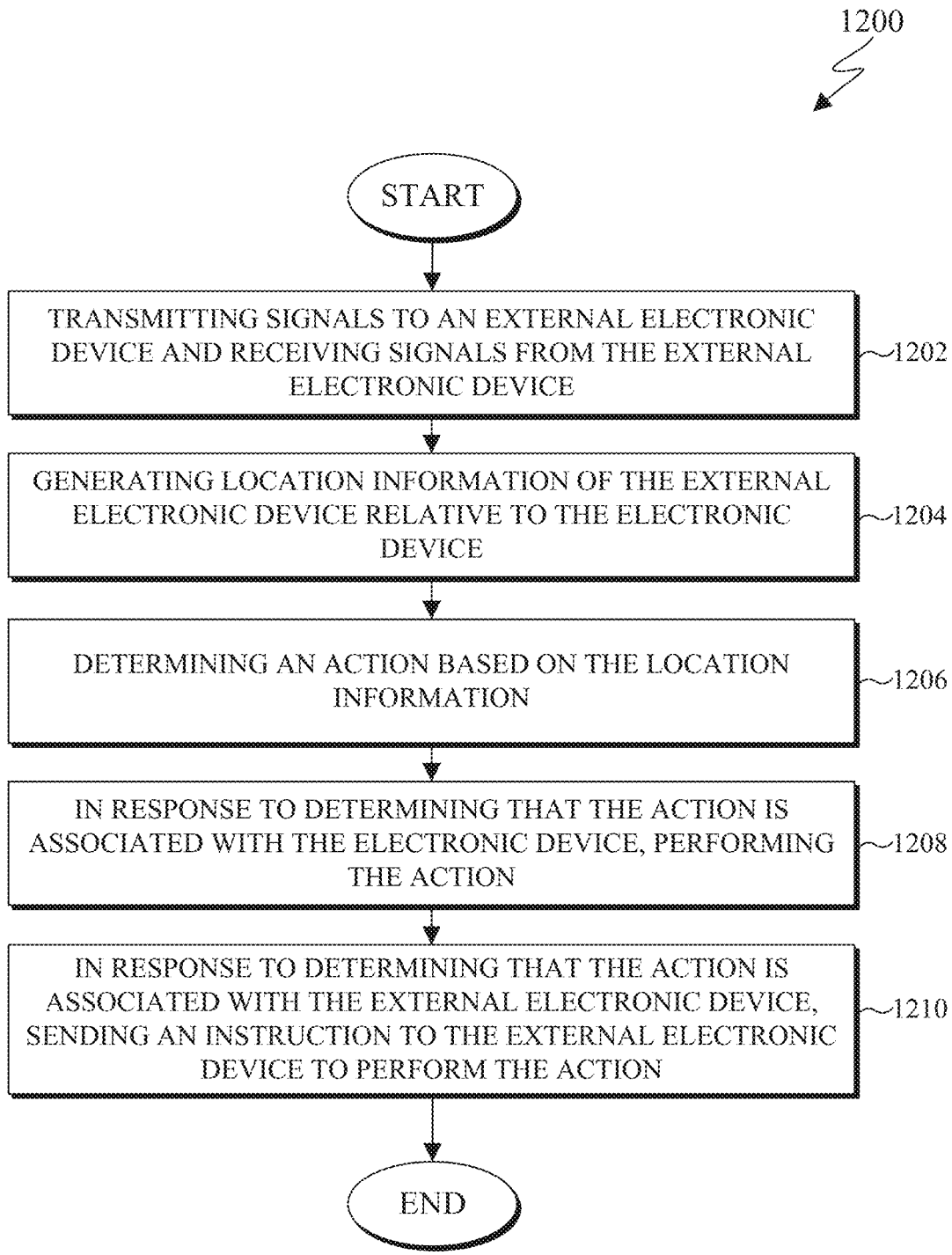
FIG. 12 illustrates an example method for gesture recognition according to embodiments of the present disclosure.

FIG. 12 illustrates an example method 1200 for gesture recognition according to embodiments of the present disclosure. The method 1200 is described as implemented by any one of the client device 106-116 of FIG. 1 and can include internal components similar to that of electronic device 200 of FIG. 2 and the electronic device 301 of FIG. 3. However, the method 1200 as shown in FIG. 12 could be used with any other suitable electronic device and in any suitable system.

In step 1202, the electronic device 200 transmits and receives signals. For example, the electronic device 200 transmits signals through a UWB transceiver (such as the measuring transceiver 270 of FIG. 2) After transmitting the signals, the electronic device can receive signals from an external electronic device.

In step 1202, the electronic device 200 generates location information the external electronic device. The location information of the external electronic device is relative to the electronic device based on a differences between the transmitted signals and the received signals.

To generate the location information, the electronic device 200 identifies a time difference between a time-stamp included in the transmitted signals, and a time-stamp included in the received signals. Based on the time differences, the electronic device 200 determines a range (distance) between the electronic device 200 and the external electronic device. The electronic device 200 can also identify at least one AOA value of the received signals from the external electronic device, with respect to the electronic device.

Depending on the arrangement of the antenna in the transceiver (such as the measuring transceiver 270) of the electronic device 200, the electronic device 200 can determine an azimuth angle, an elevation angle, or both an azimuth and elevation angle between the electronic device 200 and the external electronic device. For example, when at least two of the antennas of the transceiver electronic device 200 are vertically positioned, the AOA value indicates an elevation angle between the electronic device 200 and the external electronic device. Similarly, when at least two of the antennas of the transceiver of the electronic device 200 are horizontally positioned, the AOA value indicates an azimuth angle between the electronic device 200 and the external electronic device.

It is noted that, the location information is two dimensional when the location information comprises the range and either (i) the azimuth angle or (ii) the elevation angle between the external electronic device and the electronic device. Similarly, the location information is three dimensional when the location information comprises (i) the range, (i) the azimuth angle, and (iii) the elevation angle between the external electronic device and the electronic device.

In certain embodiments, the electronic device 200 can determine location information using multilateration. For example, the electronic device 200 can includes multiple transceivers (such as the measuring transceiver 270 of FIG. 2). The electronic device 200 can generate the location information associated with an external electronic device by performing multilateration based on the transmitted and received signals from the multiple transceivers.

In certain embodiments, the location information can be based on a single instant in time. For example, the location information can indicate a location of the device at a particular time.

In certain embodiments, the location information can be based on multiple instances of time. For example, when the location information of the external electronic device is based on differences between the transmitted signals and the received signals over a period of time, the location information can represent a gesture or movement of the external electronic device. The electronic device 200 can identify a particular gesture based on particular changes in the ranges, the azimuth angle or the elevation angle For example, the electronic device 200 can determine that the gesture is one of a ranging-type gesture based on (i) a comparison of distances between the electronic device and the external electronic device over the period of time to a ranging threshold, (ii) a comparison of angle values between the electronic device and the external electronic device over the period of time to an AOA threshold, and (iii) changes in the distances over the period of time. Based on the particular changes in the range, the electronic device 200 can identify whether the ranging-type gesture is a push gesture, a pull gesture, a push-pull gesture, a double tap gesture, or the like.

For another example, the electronic device 200 can determine that the gesture is one of an angle-type gesture based on (i) a comparison of the distances to the ranging threshold, a comparison of the angle values to the AOA threshold, and (ii) changes in the angle values over the period of time. Based on the particular changes in the range, the electronic device 200 can identify whether the angle-type gesture is a swipe left gesture, swipe right gesture, a wave gesture, a clockwise circle gesture, or a counterclockwise circle gesture, or the like.

In certain embodiments, to determine whether a gesture is a circular gesture, the electronic device 200 compares the angle values to an azimuth threshold, and the angle values to an elevation threshold. The electronic device then identifies a pattern based on changes in an azimuth angle and an elevation angle over the period of time. based on the pattern, the electronic device can determine whether the circular gesture is in a clockwise direction or in a counter-clockwise direction.

In step 1208, the electronic device 200 determines an action that is to be performed based on the location information. In certain embodiments, if the electronic device 200 identifies a gesture from the location information, the determined action can be based on the identified gesture. In other embodiments, the electronic device can determine an action based on the actual location of the external electronic device. Additionally, the electronic device 200 can also use its own state (the state of the electronic device 200), the state of the external electronic device, or both, when determining the action to be performed.

For example, the electronic device 200 can determine the action to be performed based on a comparison of the distance (as identified form the location information) between itself (the electronic device 200) and the external electronic device to a threshold.

For another example, the electronic device can identify its current state, the current state of the external electronic device, or the state of both devices. The state can be whether a device is on, off, whether a device currently executing an application, and if so, the type of application being executed, whether a display of a device is on, whether content is playing or paused on the device, and the like. Based on the determined distance between the electronic device 200 and the external electronic device, and a state of one or both of the devices, the electronic device 200 can determine an action that is to be performed.

For yet another example, the electronic device 200 can determine an action to be performed based on whether the external electronic device is within a FOV of the electronic device 200. For instance, the electronic device 200 can determine whether the external electronic device is within a FOV based on the location information. Based on whether the external electronic device is within or out of the FOV, the electronic device 200 can determine as action to be performed. When the external electronic device is within the FOV of the electronic device 200, the electronic device 200 can determine to perform a first action. In contrast, when the external electronic device is not within the FOV of the electronic device 200, the electronic device 200 can determine to perform a second action.

In certain embodiments, the electronic device 200 can generate location information associated with multiple external electronic devices. The multiple external electronic devices can be associated with a single user or two or more users. When generating the location information of multiple external electronic devices, the electronic device 200 can transmit and receive signals from the multiple external electronic devices. In some embodiments, the multiple external electronic devices can provide indication to the electronic device 200. The identification can be used to identify the device and its particular owner. Some of the multiple electronic devices can also provide an indication as to whether the particular device is a wearable device and whether the external device is currently being worn by a respective user.

For example, when the electronic device 200 determines that the multiple external electronic devices are associated with a single user, the electronic device 200 can prioritize the external electronic devices. For instance, the electronic device 200 can prioritize a wearable device that is currently worn over a non-wearable device. Similarly, the electronic device 200 can prioritize a non-wearable device over a wearable device that is currently not worn. Based on the prioritization, the electronic device 200 determines an action for changing the state on at least one of (i) the electronic device 200, or (ii) one of the external electronic devices is based on the additional location information.

For another example, when the electronic device 200 determines that the multiple external electronic devices are associated with different users, the electronic device 200 can determine an action to perform based on the location of the multiple external electronic devices. For example, when a first external electronic device is associated with a first person and a second external electronic device is associated with a second person, the electronic device 200 can determine if any of the external electronic devices are within a distance threshold relative to the electronic device 200. The electronic device 200 determines an action to perform, based on which external device(s) is within the distance threshold.

In step 1208, the electronic device 200 determines whether the determined action is associated with the electronic device 200. If the determined action is associated with the electronic device 200, then the electronic device 200 performs the action. The action could include changing a state of the electronic device 200. For example, the action could be turning on, or turning off. For another example, the action could be logging into a service or account. For yet another example, the action could be changing a channel, changing the volume, playing content, pausing content, and the like.

In step 1210, the electronic device 200 determines whether the determined action is associated with the external electronic device. If the determined action is associated with the external electronic device, then the electronic device 200 sends an instruction to the external electronic device. The instruction notifies the external electronic device to perform a particular action.

Although FIG. 12 illustrates an example method, various changes may be made to FIG. 12. For example, while the method 1200 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for operating an electronic device, the method comprising:
transmitting signals, via a transceiver of the electronic device, to an external electronic device;
receiving signals, via the transceiver, from the external electronic device;
generating location information of the external electronic device relative to the electronic device based on differences between the transmitted signals and the received signals, the location information comprising (i) a range between the electronic device and the external electronic device and (ii) at least one angle of arrival (AOA) value of the received signals;
determining an action for changing a state of at least one of the electronic device or the external electronic device based on the location information;
performing at least one of:
in response to determining that the action is associated with the electronic device, performing the action; or
in response to determining that the action is associated with the external electronic device, sending an instruction to the external electronic device to perform the action,
wherein determining the action for changing the state of the at least one of the electronic device or the external electronic device based on the location information comprises:
determining whether the external electronic device is within a field of view (FOV) of the electronic device, based on whether the range between the electronic device and the external electronic device is within a range of range values representing the FOV and the at least one AOA value is within a range of AOA values representing the FOV;
identifying a first action, of a plurality of actions, to be performed when the external electronic device is within the FOV of the electronic device; and
identifying a second action, of the plurality of actions, to be performed when the external electronic device is outside the FOV of the electronic device.

2. The method of claim 1, wherein generating the location information comprises:
identifying a time difference between a time-stamp included in the transmitted signals and a time-stamp included in the received signals;
determining the range between the electronic device and the external electronic device based on the time difference; and
identifying the at least one AOA value of the received signals from the external electronic device, with respect to the electronic device, based on a distance between antennas of the transceiver and relative positioning of the antennas of the transceiver.

3. The method of claim 2, wherein:
when at least two of the antennas of the transceiver are vertically positioned, the AOA value indicates an elevation angle between the electronic device and the external electronic device;
when at least two of the antennas of the transceiver are horizontally positioned, the AOA value indicates an azimuth angle between the electronic device and the external electronic device;
the location information is two dimensional when the location information comprises the range and either the azimuth angle or the elevation angle between the external electronic device and the electronic device; and
the location information is three dimensional when the location information comprises the range, the azimuth angle, and the elevation angle between the external electronic device and the electronic device.

4. The method of claim 1, wherein generating the location information of the external electronic device is based on differences between the transmitted signals and the received signals over a period of time, representing a gesture.

5. The method of claim 4, further comprising:
determining that the gesture is one of a ranging-type gesture based on a comparison of distances between the electronic device and the external electronic device over the period of time to a ranging threshold, a comparison of angle values between the electronic device and the external electronic device over the period of time to an AOA threshold, and changes in the distances over the period of time; and
determining that the gesture is one of an angle-type gesture based on a comparison of the distances to the ranging threshold, a comparison of the angle values to the AOA threshold, and changes in the angle values over the period of time,
wherein the ranging-type gesture is one of a push gesture, a pull gesture, a push-pull gesture, or a double tap gesture, and
wherein the angle-type gesture is one of a swipe left gesture, a swipe right gesture, a wave gesture, a clockwise circle gesture, or a counterclockwise circle gesture.

6. The method of claim 5, further comprising:
determining that the gesture is a circular gesture based on a comparison of the angle values to an azimuth threshold, and a comparison of the angle values to an elevation threshold;
identifying a pattern based on changes in an azimuth angle and an elevation angle over the period of time; and
determining that the circular gesture is in a clockwise direction or in a counter-clockwise direction based on the pattern.

7. The method of claim 4, further comprising:
identifying the gesture based on the location information of the external electronic device over the period of time,
wherein the action is determined based in part on the gesture.

8. The method of claim 1, wherein:
the transceiver is one of multiple transceivers located on the electronic device, and
generating the location information of the external electronic device comprises performing multilateration based on the transmitted signals and received signals by the multiple transceivers.

9. The method of claim 1, further comprising:
identifying a distance between the external electronic device and the electronic device, based on the location information,
wherein the action is determined based on a comparison of the distance to a threshold.

10. The method of claim 9, further comprising:
identifying a current state of the electronic device and a current state of the external electronic device,
wherein the action is determined based in part on the comparison, and at least one of the current state of the electronic device and the current state the external electronic device.

11. The method of claim 1, further comprising:
transmitting additional signals, via the transceiver, to a wearable electronic device;
receiving additional signals, via the transceiver, from the wearable electronic device;
generating additional location information of the wearable electronic device relative to the electronic device based on differences between the additional transmitted signals and the additional received signals; and
assigning a priority to the wearable electronic device and the external electronic device based on an indication that the wearable electronic device is currently worn,
wherein the action is for changing the state of at least one of the electronic device, the wearable electronic device, or the external electronic device, and is determined based on the additional location information and the assigned priority to the wearable electronic device and the external electronic device.

12. The method of claim 1, wherein:
the external electronic device is a first electronic device and the location information represents a distance between the first electronic device and the electronic device; and
the method further comprises:
transmitting signals, via the transceiver, to a second electronic device,
receiving signals, via the transceiver, from the second electronic device,
generating additional location information of the second electronic device representing a distance between the second electronic device and the electronic device,
determining whether the first electronic device and the second electronic device are associated with different users,
comparing the location information of the first electronic device to a first distance threshold and the additional location information of the second electronic device to a second distance threshold, and in response to determining that the first electronic device and the second electronic device are associated with different users, determining the action based on the comparison.

13. An electronic device comprising:
a transceiver; and
a processor operably coupled with the transceiver and configured to:
    transmit signals, via the transceiver, to an external electronic device,
    receive signals, via the transceiver, from the external electronic device,
    generate location information of the external electronic device relative to the electronic device based on differences between the transmitted signals and the received signals, the location information comprising (i) a range between the electronic device and the external electronic device and (ii) at least one angle of arrival (AOA) value of the received signals,
    determine an action for changing a state of at least one of the electronic device or the external electronic device based on the location information,
    perform at least one of:
        in response to determining that the action is associated with the electronic device, perform the action, or
        in response to determining that the action is associated with the external electronic device, send an instruction to the external electronic device to perform the action,
    wherein to determine the action for changing the state of the at least one of the electronic device or the external electronic device based on the location information, the processor is configured to:
        determine whether the external electronic device is within a field of view (FOV) of the electronic device, based on whether the range between the electronic device and the external electronic device is within a range of range values representing the FOV and the at least one AOA value is within a range of AOA values representing the FOV;
        identify a first action, of a plurality of actions, to be performed when the external electronic device is within the FOV of the electronic device; and
        identify a second action, of the plurality of actions, to be performed when the external electronic device is outside the FOV of the electronic device.

14. The electronic device of claim 13, wherein to generate the location information, the processor is configured to:
    identify a time difference between a time-stamp included in the transmitted signals and a time-stamp included in the received signals;
    determine the range between the electronic device and the external electronic device based on the time difference; and
    identify the at least one AOA value of the received signals from the external electronic device, with respect to the electronic device, based on a distance between antennas of the transceiver and relative positioning of the antennas of the transceiver.

15. The electronic device of claim 14, wherein:
    when at least two of the antennas of the transceiver are vertically positioned, the AOA value indicates an elevation angle between the electronic device and the external electronic device;
    when at least two of the antennas of the transceiver are horizontally positioned, the AOA value indicates an azimuth angle between the electronic device and the external electronic device;
    the location information is two dimensional when the location information comprises the range and either the azimuth angle or the elevation angle between the external electronic device and the electronic device; and
    the location information is three dimensional when the location information comprises the range, the azimuth angle, and the elevation angle between the external electronic device and the electronic device.

16. The electronic device of claim 13, wherein the location information of the external electronic device is based on differences between the transmitted signals and the received signals over a period of time, representing a gesture.

17. The electronic device of claim 16, wherein the processor is further configured to:
    determine that the gesture is one of a ranging-type gesture based on a comparison of distances between the electronic device and the external electronic device over the period of time to a ranging threshold, a comparison of angle values between the electronic device and the external electronic device over the period of time to an AOA threshold, and changes in the distances over the period of time; and
    determine that the gesture is one of an angle-type gesture based on a comparison of the distances to the ranging threshold, a comparison of the angle values to the AOA threshold, and changes in the angle values over the period of time,
    wherein the ranging-type gesture is one of a push gesture, a pull gesture, a push-pull gesture, or a double tap gesture, and
    wherein the angle-type gesture is one of a swipe left gesture, a swipe right gesture, a wave gesture, a clockwise circle gesture, or a counterclockwise circle gesture.

18. The electronic device of claim 17, wherein the processor is further configured to:
    determine that the gesture is a circular gesture based on a comparison of the angle values to an azimuth threshold, and a comparison of the angle values to an elevation threshold;
    identify a pattern based on changes in an azimuth angle and an elevation angle over the period of time; and
    determine that the circular gesture is in a clockwise direction or in a counter-clockwise direction based on the pattern.

19. The electronic device of claim 16, wherein the processor is further configured to:
    identify the gesture based on the location information of the external electronic device over the period of time; and
    determine the action based in part on the gesture.

20. The electronic device of claim 13, wherein:
    the transceiver is one of multiple transceivers located on the electronic device, and
    to generate the location information of the external electronic device, the processor is configured perform multilateration based on the transmitted signals and received signals by the multiple transceivers.

21. The electronic device of claim 13, wherein the processor is further configured to:
- identify a distance between the external electronic device and the electronic device, based on the location information; and
- determine the action based on a comparison of the distance to a threshold.

22. The electronic device of claim 21, wherein the processor is further configured to:
- identify a current state of the electronic device and a current state the external electronic device; and
- determine the action based in part on the comparison, and at least one of the current state of the electronic device and the current state the external electronic device.

23. The electronic device of claim 13, wherein the processor is further configured to:
- transmit additional signals, via the transceiver, to a wearable electronic device;
- receive additional signals, via the transceiver, from the wearable electronic device;
- generate additional location information of the wearable electronic device relative to the electronic device based on differences between the additional transmitted signals and the additional received signals; and
- assign a priority to the wearable electronic device and the external electronic device based on an indication that the wearable electronic device is currently worn,
- wherein the action is for changing the state of at least one of the electronic device, the wearable electronic device, or the external electronic device, and is determined based on the additional location information and the assigned priority to the wearable electronic device and the external electronic device.

24. The electronic device of claim 13, wherein:
the external electronic device is a first electronic device and the location information represents a distance between the first electronic device and the electronic device; and
the processor is further configured to:
- transmit signals, via the transceiver, to a second electronic device,
- receive signals, via the transceiver, from the second electronic device,
- generate additional location information of the second electronic device representing a distance between the second electronic device and the electronic device,
- determine whether the first electronic device and the second electronic device are associated with different users,
- compare the location information of the first electronic device to a first distance threshold and the additional location information of the second electronic device to a second distance threshold, and
- in response to determining that the first electronic device and the second electronic device are associated with different users, determine the action for changing the state of at least one of the electronic device, or the external electronic device based on the comparison.

25. A non-transitory computer readable medium embodying a computer program, the computer program comprising computer readable program code that, when executed by a processor of an electronic device, causes the processor to:
- transmit signals, via a transceiver of the electronic device, to an external electronic device;
- receive signals, via the transceiver, from the external electronic device;
- generate location information of the external electronic device relative to the electronic device based on differences between the transmitted signals and the received signals, the location information comprising (i) a range between the electronic device and the external electronic device and (ii) at least one angle of arrival (AOA) value of the received signals;
- determine an action for changing a state of at least one of the electronic device or the external electronic device based on the location information;
- perform at least one of:
  - in response to determining that the action is associated with the electronic device, perform the action; or
  - in response to determining that the action is associated with the external electronic device, send an instruction to the external electronic device to perform the action,
- wherein the computer readable program code to determine the action for changing the state of the at least one of the electronic device or the external electronic device based on the location information comprises computer readable program code to:
  - determine whether the external electronic device is within a field of view (FOV) of the electronic device, based on whether the range between the electronic device and the external electronic device is within a range of range values representing the FOV and the at least one AOA value is within a range of AOA values representing the FOV;
  - identify a first action, of a plurality of actions, to be performed when the external electronic device is within the FOV of the electronic device; and
  - identify a second action, of the plurality of actions, to be performed when the external electronic device is outside the FOV of the electronic device.

26. The non-transitory computer readable medium of claim 25, wherein:
the location information of the external electronic device is based on differences between the transmitted signals and the received signals over a period of time, representing a gesture, and
the computer readable program code, when executed by the processor, further causes the processor to:
- determine that the gesture is one of a ranging-type gesture based on a comparison of distances between the electronic device and the external electronic device over the period of time to a ranging threshold, a comparison of angle values between the electronic device and the external electronic device over the period of time to an AOA threshold, and changes in the distances over the period of time,
- determine that the gesture is one of an angle-type gesture based on a comparison of the distances to the ranging threshold, a comparison of the angle values to the AOA threshold, and changes in the angle values over the period of time, and
- determine the action based in part on the gesture,
- wherein the ranging-type gesture is one of a push gesture, a pull gesture, a push-pull gesture, or a double tap gesture, and
- wherein the angle-type gesture is one of a swipe left gesture, a swipe right gesture, a wave gesture, a clockwise circle gesture, or a counterclockwise circle gesture.

27. The non-transitory computer readable medium of claim 25, wherein to generate the location information the computer readable program code, when executed by the processor, further causes the processor to:
 identify a time difference between a time-stamp included in the transmitted signals, and a time-stamp included in the received signals;
 determine the range between the electronic device and the external electronic device based on the time difference; and
 identify the at least one AOA value of the received signals from the external electronic device, with respect to the electronic device, based on a distance between antennas of the transceiver and relative positioning of the antennas of the transceiver.

28. The non-transitory computer readable medium of claim 25, wherein the computer readable program code, when executed by the processor, further causes the processor to:
 identify a distance between the external electronic device and the electronic device, based on the location information; and
 determine the action based on a comparison of the distance to a threshold.

\* \* \* \* \*